US006738406B2

(12) United States Patent
Vogler

(10) Patent No.: US 6,738,406 B2
(45) Date of Patent: May 18, 2004

(54) PRECISION MEASUREMENT OF WAVELENGTHS EMITTED BY A MOLECULAR FLUORINE LASER AT 157NM

(75) Inventor: Klaus Wolfgang Vogler, Eckental (DE)

(73) Assignee: Lambda Physik AG, Goettingen (DE)

(*) Notice: Subject to any disclaimer, the term of this patent is extended or adjusted under 35 U.S.C. 154(b) by 0 days.

(21) Appl. No.: 10/194,977

(22) Filed: Jul. 12, 2002

(65) Prior Publication Data

US 2003/0133487 A1 Jul. 17, 2003

Related U.S. Application Data

(63) Continuation-in-part of application No. 09/883,128, filed on Jun. 15, 2001, and a continuation-in-part of application No. 09/849,600, filed on May 4, 2001, now Pat. No. 6,608,848.
(60) Provisional application No. 60/305,368, filed on Jul. 12, 2001, provisional application No. 60/297,199, filed on Jun. 7, 2001, and provisional application No. 60/212,301, filed on Jun. 19, 2000.

(51) Int. Cl.$^7$ .................................................. H01S 3/22
(52) U.S. Cl. .......................... 372/60; 372/57; 372/58; 372/59
(58) Field of Search ................................ 372/60, 57–59

(56) References Cited

U.S. PATENT DOCUMENTS

| 4,611,270 | A | | 9/1986 | Klauminzer et al. ........ 364/183 |
| 4,759,179 | A | * | 7/1988 | Benard et al. ................. 60/218 |
| 5,218,421 | A | | 6/1993 | Wakabayashi et al. ...... 356/352 |
| 5,978,391 | A | | 11/1999 | Das et al. ...................... 372/20 |
| 5,978,394 | A | | 11/1999 | Newman et al. ............... 372/32 |
| 6,160,831 | A | | 12/2000 | Kleinschmidt et al. ....... 372/57 |
| 6,160,832 | A | * | 12/2000 | Kleinschmidt et al. ....... 372/57 |
| 6,269,110 | B1 | | 7/2001 | Leinhos et al. ................ 372/57 |

(List continued on next page.)

FOREIGN PATENT DOCUMENTS

| DE | 199 35 035 A1 | 7/1999 | ........... H01S/3/136 |
| EP | 0 332 699 A1 | 8/1987 | ............. G01J/9/00 |
| EP | 0 795 120 B1 | 8/1994 | ............. H01S/3/13 |

OTHER PUBLICATIONS

P. Camus, "Atomic Spectroscopy with Optogalvanic Detection," *Journal De Physique,* Colloque C7, Suppl. No. 11, Tome 44, Nov. 1983, pp. C7-87-C7-106.

C.J. Sansonetti et al., "Precision measurement of wavelengths emitted by a molecular fluorine laser at 175 nm," *Applied Optics,* vol. 40, No. 12, Apr. 20, 2001, pp. 1974–1978.

J.E. Sansonetti et al., "Atlas of the Spectrum of a Platinum/Neon Hollow–Cathode Reference Lamp in the Region 1130–4330 Å," *Journal of Research of the National Institute of Standards and Technology,* vol. 97, No. 1, Jan.–Feb. 1992, pp. 1–211.

U.S. patent application Publication No. US 2003/0133487 A1, published Jul. 17, 2003, application no. 10/194,977, applicant: Klaus Wolfgang Vogler.

U.S. patent application Ser. No. 10/384,508, filed Mar. 7, 2003, applicant: Peter Lokai et al.

U.S. patent application Ser. No. 60/450,527, filed Feb. 27, 2003, applicant: Hans–Stephan Albrecht et al.

*Primary Examiner*—Leon Scott, Jr.
(74) *Attorney, Agent, or Firm*—Stallman & Pollock LLP

(57) ABSTRACT

An excimer or molecular fluorine laser system includes a wavelength calibration module permitting the wavelength of the narrow band output beam to be calibrated to a specific absolute wavelength. The module is preferably a lamp which contains at least one species including platinum with an optical transition within the emission spectrum of the laser system. Light from the lamp is preferably coincident at a spectrometer with a beam portion from the laser, and the laser beam wavelength is calibrated by simultaneous analysis at the spectrograph.

1 Claim, 7 Drawing Sheets

U.S. PATENT DOCUMENTS

| | | | |
|---|---|---|---|
| 6,270,861 B1 * | 8/2001 | Mashburn | 427/561 |
| 6,396,582 B1 | 5/2002 | Buck et al. | 356/328 |
| 6,404,795 B1 | 6/2002 | Leinhos et al. | 372/57 |
| 6,553,050 B1 * | 4/2003 | Kleinschmidt et al. | 372/57 |
| 6,556,600 B2 * | 4/2003 | Sandstrom et al. | 372/25 |
| 6,577,663 B2 * | 6/2003 | Vogler | 372/57 |
| 6,580,517 B2 | 6/2003 | Lokai et al. | 356/519 |
| 6,590,922 B2 * | 7/2003 | Onkels et al. | 372/57 |
| 6,597,462 B2 | 7/2003 | Kramer et al. | 356/519 |
| 6,608,848 B2 | 8/2003 | Kleinschmidt et al. | 372/32 |
| 2002/0006148 A1 * | 1/2002 | Govorkov et al. | 372/55 |
| 2002/0018505 A1 * | 2/2002 | Basting et al. | 372/55 |
| 2002/0018506 A1 * | 2/2002 | Vogler | 372/55 |
| 2002/0021729 A1 * | 2/2002 | Vogler | 372/55 |
| 2002/0021731 A1 * | 2/2002 | Bragin et al. | 372/57 |
| 2002/0031160 A1 * | 3/2002 | Desor | 372/57 |
| 2002/0041615 A1 * | 4/2002 | Borisov et al. | 372/57 |
| 2002/0057723 A1 * | 5/2002 | Kleinschmidt | 372/57 |
| 2002/0101900 A1 * | 8/2002 | Govorkov | 372/57 |
| 2002/0105995 A1 * | 8/2002 | Govorkov et al. | 372/57 |
| 2002/0114370 A1 * | 8/2002 | Onkels et al. | 372/55 |
| 2002/0141471 A1 * | 10/2002 | Aab et al. | 372/57 |
| 2002/0186739 A1 * | 12/2002 | Sandstrom et al. | 372/55 |
| 2003/0133487 A1 * | 7/2003 | Vogler | 372/55 |

* cited by examiner

PRECISION MEASUREMENT OF WAVELENGTHS EMITTED BY A MOLECULAR FLUORINE LASER AT 157NM

PRIORITY

This Application claims priority to U.S. provisional application No. 60/305,368, filed Jul. 12, 2001; and this Application is a Continuation-in-Part which claims priority to U.S. patent application Ser. No. 09/849,600, filed on May 4, 2001 which claims priority to U.S. patent application Ser. No. 09/679,592, now U.S. Pat. No. 6,272,158, which claims priority to U.S. patent application Ser. No. 09/416,344, now U.S. Pat. No. 6,160,832, which claims priority to U.S. patent application Ser. No. 09/088,622, filed Jun. 1, 1998, and U.S. patent application Ser. No. 09/136,275, filed Aug. 19, 2001, which are each hereby incorporated by reference; and this Application is a Continuation-in-Part which claims priority to U.S. patent application Ser. No. 09/883,128 filed Jun. 15, 2001, which claims priority to U.S. provisional patent application Nos. 60/297,199, filed Jun. 7, 2001 and 60/212,301, filed Jun. 19, 2000, which are each hereby incorporated by reference.

BACKGROUND OF THE INVENTION

1. Field of the Invention

The invention relates to molecular fluorine lasers, and particularly to precise wavelength control and monitoring of a VUV beam.

2. Discussion of the Related Art

In the near future, production of integrated circuits for computer chips is expected to utilize microlithography based on a molecular fluorine ($F_2$) laser operating at a wavelength of 157 nm. According to the *International Technology Roadmap for Semiconductors,* Semiconductor Industry Association, 1999 Edition (International SEMATECH, Austin, Tex. 1999, which is hereby incorporated by reference, the 157-nm laser will permit production of integrated circuits for computer chips with critical dimensions of 100 nm and perhaps as low as 50 nm. Currently, all basic technologies for 157-nm lithography are under thorough investigation and intense development (see J. A. McClay and A. S. L. McInture, "157 nm Optical Lithography: The Accomplishments and the Challenges," Solid States Technol. 42, 57–68 (1999), which is hereby incorporated by reference). For the accurate design of projection optics for lithography tools, precise knowledge of the spectral properties of $F_2$ lasers designed for lithography, particularly the emission wavelength and bandwidth, is desired.

Lasing in molecular fluorine was first reported by Rice et al. in 1977 (see "VUV Emissions From Mixtures of $F_2$ and the Noble Gases—a Molecular $F_2$ Laser at 1575 Angstroms", Appl. Phys. Lett. 31, 31–33 (1977), which is hereby incorporated by reference). Since then, the 157-nm $F_2$ laser has undergone significant development. Today, $F_2$ lasers operating at 157 nm are available for both low and high-power applications. Some details of the output characteristics of the $F_2$ laser have been given by Kakehata et al (see Output Characteristics of a Discharge-Pumped $F_2$ Laser (157 nm) with an Injection-Seeded Unstable Resonator," J. Appl. Phys. 74, 2241–2246 (1983), which is hereby incorporated by reference). A summary of the development and properties of F2 lasers operating at 157 nm is given in the review paper of Hooker and Webb (see S. M. Hooker and C. E. Webb, "Progress in Vacuum Ultraviolet Lasers," Prog. Quantum Electron. 18, 227–274 (1994).

Because the index of refraction of optically transmissive materials such as $CaF_2$ and $BaF_2$ that may be preferred for use with the 157-nm illumination and projection optics varies rapidly with wavelength, it is desired that the wavelength of the laser be known to high accuracy. An accuracy of approximately one part in $10^6$ is particularly desired. The first wavelengths for the $F_2$ laser were given by Woodworth and Rice (see "An Efficient, High-Power $F_2$ Laser Near 157 nm," J. Chem. Phys. 69, 2500–2504 (1978), which is hereby incorporated by reference). By using an evacuated Seya-Namioka spectrometer to record a spectrum on Kodak short-wave radiation (SWR) film, they measured wavelengths of 156.71(1) nm, 157.48(1) nm, and 157.59(1) nm for the three observed lasing transitions, the main line being that at 157.59 nm (see M. J. Weber, Handbook of Laser Wavelengths (CRC Press, Boca Raton, Fla., 1999), which is hereby incorporated by reference, and in earlier versions of this table as being wavelengths in air. However, these values appear to represent wavelengths in vacuum).

McKee used a long-focal-length concave-grating spectrograph at the National Research Council of Canada to make measurements for two of the three lines (see T. J. McKee, "Spectral-narrowing techniques for excimer laser oscillators," Can. J. Phys. 63, 214–219 (1985), which is hereby incorporated by reference. Although no accuracy or details of the measurements were given by McKee, review of the research log sheets at the National Research Council shows that the measurements were made by photographing light from the $F_2$ laser in seventh order on a 10.7-m normal-incidence vacuum spectrograph. Wavelengths were calibrated by lines in overlapping orders from an iron hollow-cathode lamp. Light from the hollow cathode was directed to the spectrometer by a mirror mounted at 45° to the optic axis of the spectrometer. K. P. Huber, Steacie Institute for Molecular Science, National Research Council of Canada, Ottowa, Ontario (personal communication, March 2000)). McKee obtained values of 157.5233 and 157.6299 nm, which are approximately 0.04 nm longer than those of Woodworth and Rice. These wavelengths were reproduced subsequently in the paper of Ishchenko et al. (see "Highpower efficient vacuum ultraviolet $F_2$ laser excited by an electric discharge," Sov. J. Quantum Electron, 16, 707–709 (1986), which is hereby incorporated by reference).

SUMMARY OF THE INVENTION

In view of the above, a molecular fluorine laser system is provided including a discharge chamber filled with a gas mixture including molecular fluorine and a discharge chamber buffer gas, multiple electrodes within the discharge chamber connected to a discharge circuit for energizing the gas mixture, a resonator for generating a narrow band output beam around 157 nm of a known wavelength, a wavelength selection and tuning unit for tuning the wavelength of the narrow band output beam, preferably by adjusting the gas mixture pressure, a wavelength calibration module permitting the wavelength of the narrow band output beam to be calibrated to a specific absolute wavelength. The module contains a species having an optical transition within the emission spectrum of said molecular fluorine laser system either for optically interacting with a beam portion in a region around 157-nm or for emitting light to be coincident at a spectrograph with the beam portion. The laser system is configured either to measure effects of interaction of the species with the beam portion as the wavelength of the narrow band output beam is scanned or to compare relative positions of the beam portion and lamp light after the spectrograph. The system further includes a processor for calibrating the wavelength of the narrow band output beam based wither on the measured effects of the interaction of the species with the beam portion or the comparison of the beam portion and lamp light.

An ArF-excimer laser system may include a gas mixture including molecular fluorine and a discharge chamber buffer gas, wherein argon may be added as an active rare gas for an argon fluoride laser gas mixture. The wavelength calibration module permitting the wavelength of the narrow band output beam to be calibrated to a specific absolute wavelength preferably includes platinum which has an optical transition within the emission spectrum of the excimer laser, e.g., ArF, or molecular fluorine laser system.

In preferred embodiments, a calibration module buffer gas is also contained within the wavelength calibration module. The species having the optical transition around 157 nm preferably includes platinum, and the buffer gas preferably includes neon.

The system may further include a photodetector for measuring an intensity of the output beam after the output beam traverses a volume of the module including the optically interacting species. The photodetector may measure a phototabsorption by the species of the beam portion.

The laser system may include a galvanometer for measuring a potential difference between two points separated by a volume of material including the optically interacting species filling the module. The module may include a galvatron, wherein a current is flowed between an anode and a cathode of said galvatron to cause material of the cathode to fill the galvatron in gaseous form, and the optogalvanic effect may be used for the wavelength calibration.

The system preferably further includes a sealed enclosure connected to the resonator and providing an output beam path for the beam as it exits the resonator that is substantially free of VUV photoabsorbing species so that the energy of the beam can reach an application process without substantial attenuation due to the presence of photoabsorbing species along the output beam path. A beam splitter within the enclosure may erve to separate part of the beam to be incident at the wavelength calibration module. The part of the beam that is separated at the beam splitter to be incident at the wavelength calibration module may be directed along a second beam path after the beam splitter within the enclosure that is protected from being substantially attenuated by said VUV photoabsorbing species. In operation of the molecular fluorine laser system, the wavelength calibration module calibrates the wavelength of the output beam by detecting substantially the part of the beam that is directed to the wavelength calibration module from the beam splitter module along the second beam path within the enclosure.

According to this embodiment, the system may also include a second beam splitter for reflecting another portion of the beam along a third beam path leading to a relative wavelength measurement module which is calibrated to the absolute reference of the wavelength calibration module. The same or a difference processor may receive a signal from the relative wavelength measurement module for monitoring the wavelength of the output beam in a feedback arrangement for controlling the wavelength of the output beam. The relative wavelength calibration module may include a monitor etalon and an array detector.

A window made of one of the substantially VUV transparent materials may separate an atmosphere within the sealed enclosure from that within the wavelength calibration module. A spectrograph may be coupled to the enclosure which receives a reflection of the beam portion that is incident at the window for monitoring the wavelength of the output beam.

The gas mixture of the molecular fluorine laser may include two or more buffer gases. A gas handling unit of the laser system may receive instruction signals from the processor for adjusting the amount of one or more of the buffer gases based on the instruction signals to control one or more spectral parameters of the laser pulses, such as wavelength and/or bandwidth. For example, first and second buffer gases, such as neon and helium, may be correspondingly adjusted so that the wavelength is adjusted to a desired value by adjusting the relative concentrations of the first and second buffer gases while the total pressure of the gas mixture is maintained substantially the same. According to another example, the first and second buffer gases may be correspondingly adjusted so that the bandwidth is adjusted to a desired value by adjusting the total pressure of the gas mixture while the relative concentrations of the first and second buffer gases is maintained substantially the same. In a third example, both the total pressure and relative concentrations of the buffer gases may be adjusted for adjusting both the bandwidth and the wavelength to desired values.

INCORPORATION BY REFERENCE

Figure 1A:
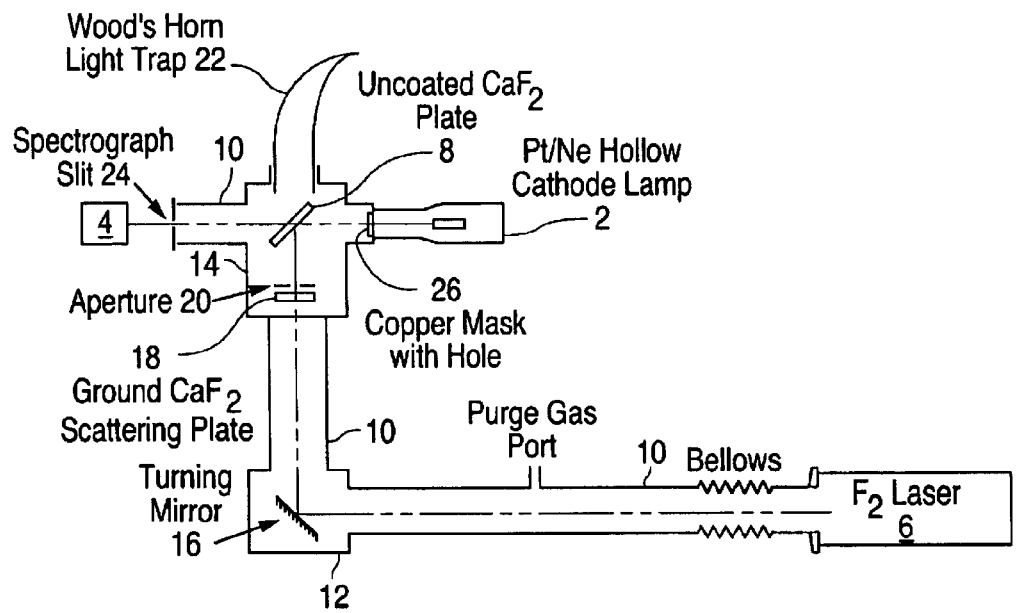
FIG. 1a schematically illustrates a beam delivery and illumination system for a molecular fluorine laser, or alternatively for an ArF laser, for a calibration procedure.

What follows is a cite list of references each of which is, in addition to those references cited above and below, and including that which is described in the related art description and in the priority section, and the above invention summary, and the abstract below, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below and within the scope of the present invention. Further patent, patent application and non-patent references are cited in the written description and are also incorporated by reference into the detailed description of the preferred embodiment with the same effect as just described with respect to the following references:

Semiconductor Industry Association. International Technology Roadmap for Semiconductors: 1999 Edition (International SEMANTECH, Austin, Tex. 1999).

J. A. McClay and A. S. L. McIntyre, "157 nm optical lithography: the accomplishments and the challenges," Solid State Technol. 42, 57–68 (1999).

J. K. Rice, A. K. Hays and J. R. Woodworth, "vuv emissions from mixtures of F2 and the noble gases—a molecular F2 laser at 1575 Å," Appl. Phys. Lett. 31, 31–33 (1977).

M. Kakehata, C.-H. Yang, Y. Ueno, and F. Kannari, "Output characteristics of a discharge-pumped F2 laser (157 nm) with an injection-seeded unstable resonator," J. Appl. Phys. 74, 2241–2246 (1983).

S. M. Hooker and C. E. Webb, "Progress in vacuum ultraviolet lasers," Prog. Quantum Electron. 18, 227–274 (1994).

J. R. Woodworth and J. K. Rice, "An efficient, high-power F2 laser near 157 nm," J. Chem. Phys. 69, 2500–2504 (1978).

M. J. Weber, Handbook of Laser Wavelengths (CRC Press, Boca Raton, Fla., 1999).

T. J. McKee, "Spectral-narrowing techniques for excimer laser oscillators," Can. J. Phys. 63, 214–219 (1985).

V. N. Ishchenko, S. A. Kochubei, and A. M. Razhev, "Highpower efficient vacuum ultraviolet F2 laser excited by an electric discharge," Sov. J. Quantum Electron, 16, 707–709 (1986).

K. Vogler, U. Stamm, 1. Bragin, F. Voss, S. Govorkov, G. Hua, J. Kleinschmidt, and R. Pätzel, "Advanced F2-lasers for microlithography," in Optical Microlithography XIII, C. J. Progler, ed., Proc. SPIE 4000, 1515–1528 (2000).

J. E. Sansonetti, J. Reader, C. J. Sansonetti, and N. Acquista, "Atlas of the spectrum of a platinum/neon hollow-cathode reference lamp in the region 1130–4330 Å," J. Res. Natl. Inst. Stand. Technol, 97, 1–211 (1992).

Kaufman, "Wavelengths, energy levels, and pressure shifts in mercury 198," J, Opt. Soc. Am. 52, 866–870 (1962).

S. H. Emara, "Wavelength shifts in Hg198 as a function of temperature," J. Res. Natl. Bur. Stand. Sect. A 65, 473–474 (1961).

R. B. Green et al., "Galvanic Detection of Optical Absorptions in a Gas Discharge," Applied Physics Letters, Vol. 29, No. 11, pp.727–729, Dec. 1, 1976;

R. Sandstrom, "Argon Fluoride Excimer Laser Source for Sub-0.25 mm Optical Lithography," Optical/Laser Microlithography IV, Vol. 1463, pp.610–616, 1991;

F. Babin et al., "Ultraviolet Optogalvanic Laser Spectroscopy of Iron for Reference Wavelengths," Optics Letters, Vol. 12, No. 7, pp.468–470, July 1987;

P. Camus, "Atomic Spectroscopy with Optogalvanic Detection, Journal De Physique, (Paris) 11 C7, pp. C7–87–106, November 1983;

Richard A. Keller et al., "Atlas for optogalvanic wavelength calibration," Applied Optics, Vol. 19, No. 6, pp. 836–837, Mar. 15, 1980;

R. A. Keller et al., "Opto-galvanic spectroscopy in a uranium hollow cathode discharge," J. Opt. Soc. Am., Vol. 69, No. 5, pp. 738–742, May 1979;

Norman J. Dovichi, et al., "Use of the optogalvanic effect and the uranium atlas for wavelength calibration of pulsed lasers," Applied Optics, Vol. 21, No. 8, pp. 1468–1473, Apr. 15, 1982;

Masakatsu Okada et al., "Electronic Tuning of Dye Lasers by an Electroooptic Birefringent Fabry-Perot Etalon," Optics Communications, Vol. 14, No. 1, pp. 4–7, 1975;

Craig Sansonetti et al., Precision Measurement of the Wavelengths Emitted by a Molecular Fluorine Laser at 157 nm, Applied Optics, Vol. 40, No. 12, 1974–1978 (Apr. 20, 2001); and U.S. patent application Ser. Nos. 09/903,425, 09/843,604, 09/883,127, 09/883,128, 09/923,770,10/035,351,10/036, 848, 60/296,898, 60/309,939, 60/332,573,60/375,695, 09/416,344, 09/791,431, 09/453,670, 09/447,882, 09/574, 921, 09/512,417, 09/694,246, 09/712,877, 09/738,849, 09/718,809, 09/733,874, and 09/780,124, which are assigned to the same assignee as the present application; and U.S. Pat. Nos. 4,926,428, 5,978,394, 5,450,207, 4,905, 243, 5,978,391, 4,823,354, 4,319,843, 4,911,778, 4,914,662, 5,142,543, 5,198,872, 5,218,421, 5,404,366, 5,764,678, 5,771,094, 6,160,831, 6,160,832, 5,373,515, 5,025,445, 6,154,470, 6,157,662, 6,219,368, 5,901,163, 6,396,582, 6,396,062, 6,381,257, 6,370,174, 6,359,922, 6,359,693, 6,320,663, 6,317,448, 5,025,445, 6,345,065, 6,381,256 and 5,420,887.

DETAILED DESCRIPTION OF THE PREFERRED EMBODIMENTS

A wavelength calibration system is provided for a molecular fluorine laser (157 nm), and alternatively for an ArF excimer laser (193 nm). The wavelength calibration system is specifically described below for use with a molecular fluorine laser. The laser system includes a discharge chamber filled with a gas mixture including molecular fluorine and one or more buffer gases such as helium and/or neon. The discharge chamber is preferably disposed within a laser tube including a blower for circulating the gas mixture and a heat exchanger for stabilizing and/or controlling the temperature of the gas mixture. Multiple electrodes such as a pair of elongated main electrodes and one or more preionization component units are provided in the discharge chamber connected to a discharge circuit for energizing the gas mixture. The discharge circuit preferably includes a high voltage power supply and a pulse compression circuit for providing compressed electrical current pulses to the electrodes. A resonator is provided for generating a laser beam. Further details of the overall laser system are provided below with reference to FIG. 7.

Wavelength/Bandwidth Control

A wavelength calibration system according to a preferred embodiment includes a platinum-neon (Pt/Ne) hollow cathode lamp. The Pt/Ne lamp may include a hollow cathode comprising platinum in a neon gas environment. Another buffer gas may be used, e.g., helium or another inert gas as understood by those skilled in the art. In operation, platinum vapor fills the hollow portion of the cathode as it is released from the solid cathode. According to the preferred embodiment, light from the lamp including one or more platinum lines around 157 nm are coincident at a spectrograph slit with a portion of the 157 nm beam emitted by the molecular fluorine laser. The superposition of these lines at a detection surface permits the precise wavelength of the beam to be understood from the known wavelengths of the platinum lines. A wavemeter such as an etalon spectrometer may be calibrated to this absolute standard and used for wavelength tuning.

In an alternative embodiment, a galvatron or gas filled module and photodetector are used instead of the preferred lamp. A portion of the 157 nm beam emitted by the molecular fluorine laser interacts in this embodiment with the platinum vapor which undergoes optical transitions at known precise wavelengths when interacting with 157 nm radiation.

Figure 1B:
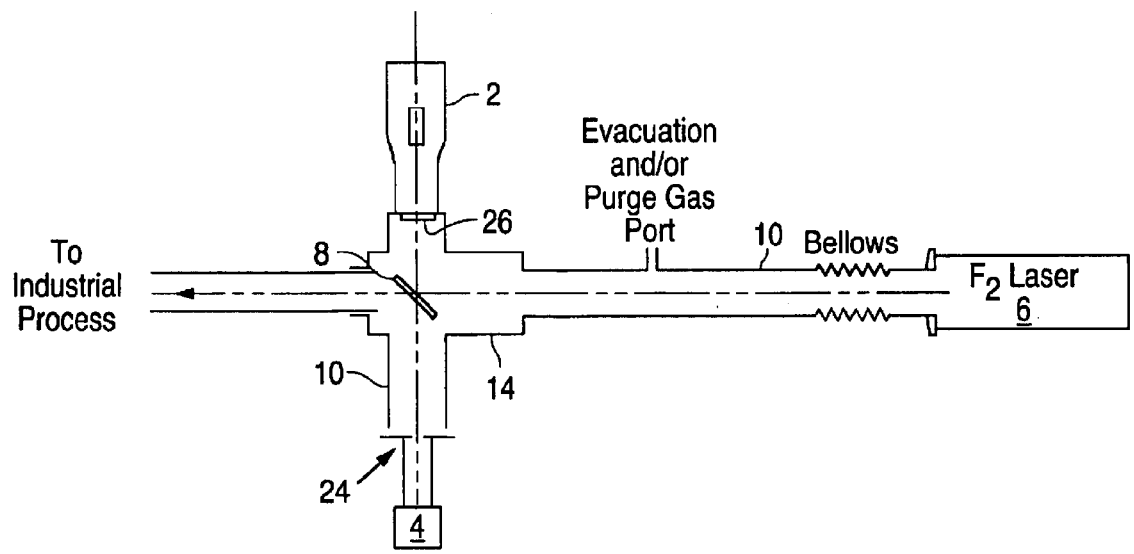
FIG. 1b schematically illustrates an on-line beam delivery and illumination system for a molecular fluorine laser, or alternatively for an ArF laser, for a calibration procedure.

Additional details of preferred and alternative wavelength calibration systems are provided below with reference to FIGS. 1a–1b, 8a, 8b and 9, and at U.S. Pat. Nos. 6,160,832 and 6,272,158, and U.S. patent application Ser. Nos. 09/791,431 and 60/375,695, which are assigned to the same assignee as the present application, each patent and patent application being hereby incorporated by reference. Results of some measurements taken with the preferred arrangements of FIGS. 1a–1b are shown at FIGS. 2–6 as relative spectral distances of $F_2$ lines to one or more Pt lines.

A beam line or optical path for a 157 nm laser beam emitted from the molecular fluorine laser, or ArF laser, is provided with a prepared atmosphere. The beam line is enclosed by an enclosure with its interior maintained substantially free of species that photoabsorb around 157 nm (and/or 193 nm) such as water vapor, oxygen, hydrocarbons and possibly other contaminant species as understood by those skilled in the art. The interior of the enclosure may be filled with an inert gas such as nitrogen or a noble gas such as argon, helium or others, which may be stagnant or continuously flowing (see U.S. Pat. Nos. 6,327,290 and 6,399,916, U.S. patent application Ser. No. 09/598,552, which is assigned to the same assignee as the present application, as well as the references cited therein, which are each hereby incorporated by reference), and the enclosure may be evacuated to a low pressure with or without following the evacuating with backfilling of the inert gas.

A hollow cathode lamp may be disposed in an enclosure which is coupled to the beam line enclosure for maintaining the atmosphere around the beam path to the lamp enclosure also substantially free of VUV photoabsorbing species. The lamp itself includes a species that photoabsorbs around 157 nm (and/or 193 nm), e.g., preferably including platinum, for performing wavelength calibration. The lamp may include another species in combination with or in lieu of platinum such as silicon, bromine or selenium for 157 nm, and e.g., arsenic (193.759 nm), germanium (193.4048 nm), carbon (193.0905 nm, and other lines), iron, cobalt, gaseous hydrocarbons, halogenized hydrocarbons and carbon-contaminated inert gases for 193 nm, among others as may be understood by those skilled in the art and/or as set forth in the references (see, e.g., U.S. patent application Ser. No. 09/791,431, incorporated by reference above). Enclosures of other modules may be coupled with the beam line enclosure such as an energy detector, beam profilometer, temporal pulse shape detector, ASE detector and/or a relative wavelength detector such as a monitor etalon, among others as may be understood by those skilled in the art. Another enclosure that may be coupled with the beam line enclosure is a spectrograph enclosure (see FIGS. 1a–1b).

The hollow cathode lamp enclosure may include a copper plate near a window of the lamp enclosure. The copper plate has an aperture for allowing light to enter the lamp enclosure. The copper plate advantageously absorbs 157 nm light other than that which enters through the aperture such as to control the light entering and/or exiting the lamp enclosure.

The beam path enclosure may include at least one window preferably comprising $MgF_2$ and alternatively comprising another material having a high transparency to 157 nm radiation such as $CaF_2$, $BaF_2$, $SrF_2$ or LiF among others as may be understood by those skilled in the art (see FIGS. 1a–1b and description below, and U.S. Pat. No. 6,327,290, incorporated by reference above). The window advantageously separates the atmosphere in the beam line enclosure from the atmosphere(s) in any enclosures that may be coupled with the beam line enclosure.

A spectrograph may be included for precision measurement of wavelength emitted by a molecular fluorine laser around 157 nm, and alternatively for an ArF laser emitting around 193 nm. The spectrograph is preferably coupled to the beam line enclosure such as is described below with reference to FIGS. 1a–1b. Light emitted by the molecular fluorine laser propagates along a beam line within the enclosure until it reaches a beam splitter for directing the light to the wavelength calibration module in the embodiment of FIG. 1b, or until the light is scattered at a scattering plate preferably comprising $CaF_2$ in the embodiment of FIG. 1a, and alternatively comprising another substantially VUV transparent material such as $MgF_2$, $BaF_2$, $SrF_2$ or LiF. In the embodiment of FIG. 1a, an aperture is preferably disposed after the scattering plate. The scattering plate may be as otherwise described at U.S. patent application Ser. No. 09/574,921, which is assigned to the same assignee as the present application and is hereby incorporated by reference.

The beam next encounters a beam splitting optic in the embodiment of FIG. 1a, and first encounters this optics in the embodiment of FIG. 1b. The beam splitting optics is preferably an uncoated $CaF_2$ plate. Light passing through the $CaF_2$ plate preferably continues on to an application process or is trapped by a light trap such as a Wood's Horn. Light reflected by the $CaF_2$ plate next encounters the hollow cathode lamp enclosure. The window on the hollow cathode lamp enclosure reflects some of the incident light back towards the $CaF_2$ plate. Light from the hollow cathode lamp enclosure also emanates toward the $CaF_2$ plate while both the laser light and the light emanating from the lamp enclosure appear to emanate from the aperture in the copper plate disposed near the lamp enclosure window.

The laser and lamp light pass through the $CaF_2$ plate and next encounter a window on a spectrograph enclosure. Light passing through the window then passes through a slit on the spectrograph. The spectrograph may be a grating spectrograph or may alternatively be an interference spectrograph or otherwise as understood by those skilled in the art.

The buffer gas in the laser tube of a molecular fluorine laser may be controlled for controlling a spectral parameter such as bandwidth and/or wavelength of a beam emitted by the laser, as described more detail below with reference to FIGS. 10–11. A processor is provided with the laser system. The processor receives signals representing values of the wavelength(s) and/or bandwidths emitted by the laser either using the spectrograph described otherwise herein or using a monitor etalon relative wavelength calibration system, preferably in conjunction with an absolute reference calibration system such as is described with reference to FIGS. 1a–1b and 8a–8b herein. Based on, e.g., bandwidth value signals received by the processor, the processor controls a gas handling unit, which is coupled with the laser tube, to adjust the total pressure of the gas mixture by adjusting the partial pressure of at least one of one or more buffer gases in the gas mixture. In so doing, the processor adjusts and/or controls the bandwidth emitted by the molecular fluorine laser. An auxiliary volume coupled with the laser tube may facilitate these pressure adjustments.

Buffer gas partial pressure(s) in the laser tube of a molecular fluorine laser may also be controlled for controlling the wavelength emitted by the laser. The processor receives signals representing values of the wavelength emitted by the laser either using the spectrograph described otherwise herein or using a monitor etalon relative wavelength calibration system. Based on the wavelength value signals received by the processor, the processor controls a gas handling unit, which is coupled with the laser tube, to adjust the relative partial pressures of at least two buffer gases, e.g., neon and helium, of the gas mixture, such as by increasing the partial pressure of a first of the two buffer gases in the gas mixture while decreasing the partial pressure of a second of the two buffer gases in the gas mixture. In so doing, the processor adjusts and/or controls the wavelength emitted by the molecular fluorine laser. For example, the processor may signal the gas-handling unit to increase the partial pressure of neon while decreasing the partial pressure of helium in the gas mixture to increase the wavelength emitted by the molecular fluorine laser, or vice-versa. The molecular fluorine laser advantageously may emit a 157 nm beam having a characteristic (i.e., not otherwise line-narrowed using optics) bandwidth of less than 1 pm, and preferably between 0.62 pm and 0.82 pm. The bandwidth may be further line-narrowed by providing one or more line-narrowing optical elements within the laser resonator.

$F_2$ Laser Wavelength Measurement Apparatus

The wavelengths of six spectral lines emitted by a molecular fluorine ($F_2$) laser at around 157 nm were measured to high accuracy with the 10.7-m normal-incidence vacuum spectrograph at the National Institute of Standards and Technology and reported at Craig Sansonetti et al., Precision Measurement of the Wavelengths Emitted by a Molecular Fluorine Laser at 157 nm, Applied Optics, Vol. 40, No. 12, 1974–1978 (Apr. 20, 2001), which is hereby incorporated by reference. A schematic representation of the system used in those measurements and which may be used for performing absolute wavelength calibration for an industrial $F_2$ laser system, e.g., which may emit as few as one line around 157 nm due to line-selection optics or other system configuration, is illustrated at FIG. 1a. A variation of the system used to measure the six characteristic $F_2$ emission lines is schematically illustrates at FIG. 1b for performing absolute wavelength calibration for an industrial $F_2$ laser, which again, may be emitting as few as one line around 157 nm.

Referring to FIGS. 1a–1b, lines from a Pt—Ne hollow-cathode lamp 2 are preferably used as wavelength standards. A high-resolution spectrograph 4 or other spectrometer as may be understood by those skilled in the lithography laser art is used to calibrate the wavelengths of one or more lines generated by an industrial $F_2$ laser system. Spectra of the laser 6 and the Pt—Ne lamp 2 are preferably photographed or detected with an array detector simultaneously through an uncoated $CaF_2$ beam splitter. The optical paths are arranged so as to avoid shifts in line positions arising from possible differences in illumination of the grating by the two sources. The strongest lasing line has a wavelength of around 157.63094(10) nm, and is preferably the line selected by line-selection optics within the laser resonator and/or by an extracavity spectral filter. Changes in wavelength for variations in gas mixture composition, total gas pressure, and voltage may also be measured for calibration purposes.

The light source used is preferably a Lambda Physik NovaLine series of molecular fluorine lasers 6. Typical parameters and performance of those lasers has been reported, e.g., recently at K. Vogler, et al., "Advanced $F_2$ lasers for Microlithography," in Optical Microlithography XIII, C. J. Progler, ed., Proc. SPIE 4000, 1515–1528 (2000), which is hereby incorporated by reference. The laser may be operated with a gas fill composed of a halogen gas mix (e.g., 5% $F_2$ in He or Ne) mixed with pure He and/or pure Ne and/or a combination of He and Ne. In accordance with preferred embodiments described in more detail below, the relative concentrations and/or partial pressure(s) of He and/or Ne in the gas mixture of the $F_2$ laser 6 may be advantageously selected from varying proportions and/or absolute amounts to control spectral parameters of the output beam, and particulary the wavelength and/or bandwidth, respectively. For example, a gas mixture may be used which combines these constituents with partial pressures of 5 kPa $F_2$ in He, 5 kPa Ne, and 250 kPa He. The maximum energy of the laser used in the experiments was 15 mJ/pulse with a nominal stabilized output energy of 10 mJ/pulse. The pulse duration is approximately 8 ns at a repetition rate that can vary from 1 to 1000 Hz, although higher repetition rate lasers may be used depending on the current availability of the technology (e.g., 1–4 kHz) and on the future availability of the technology (e.g., 4–16 kHz or more). The output beam is oblong, approximately 8 mm wide by 24 mm high. Preferably, the molecular fluorine laser system includes a cw green pilot laser that emits a beam coincident with the main $F_2$ laser beam for alignment purposes (see, e.g., U.S. patent application Ser. No. 09/738,849, which is assigned to the same assignee as the present application and is hereby incorporated by reference).

The measurements may be made with the 10.7-in normal-incidence vacuum spectrograph 4 for high precision calibration such as was used in measuring the spectra at NIST as reported at Sansonetti et al, cited above. The spectrograph may be equipped with a concave grating having 1200 lines/mm and blazed for 300 nm. Photographic spectra of the lasing lines may be recorded on Kodak SWR plates in the second order of the grating, or alternatively may be detected at an array detector and transmitted to a computer for graphical analysis and display. The plate factor may be 0.038 nm/mm. The slit width may be 23 $\mu$m. The Pt—Ne hollow-cathode lamp 2 may be used for wavelength calibration to an absolute standard (see J. E. Sansonetti, et al., "Atlas of the spectrum of a platinum/neon hollow-cathode reference lamp in the region 1130–4330 Å," J. Res. Natl. Inst. Stand. Technol, 97, 1–211 (1992), which is hereby incorporated by reference).

Light from the laser 6 may be transmitted to the spectrograph 4 through a beam line including one or more and preferably several stainless-steel tube(s) 10 and one or more aluminum boxes 12, 14 holding optical elements. In the arrangement of FIG. 1a, a first aluminum box 12 includes a turning mirror 16 and a second aluminum box 14 contains a scattering plate 18, an aperture 20, and the beam splitter 8, mentioned above. In the arrangement of FIG. 1b, the aluminum box 12 is not present and the aluminum box 14 does not include the scattering plate 18 and aperture 20. In an alternative embodiment, the beam may be split off before the scattering plate 18 so that the main beam may continue to an industrial process without encountering the scattering plate 18, while the diagnostic portion of the beam does encounter the plate 18 and aperture 20.

The Pt/Ne lamp 2, the spectrograph 4, a Wood's Horn light trap 22, and the tube 10 of the beam line enclosure 10 between the laser 6 and the box 14 are preferably coupled with the aluminum box 14 at the four sides of the box 14 illustrated in FIG. 1a. The Pt/Ne lamp 2, the spectrograph 4, a further beam line enclosure 10 for the main beam continuing to an industrial process and the tube 10 of the beam line enclosure 10 between the laser 6 and the box 14 are preferably coupled with the aluminum box 14 at the four sides of the box 14 illustrated in FIG. 1b. The beam line enclosure 10 may be evacuated (initially or continuously) and/or purged with stagnant or flowing high-purity inert gas, e.g., $N_2$ or a noble gas) at or just above atmospheric pressure (see U.S. Pat. Nos. 6,399,916 and 6,219,368 and U.S. patent application Ser. No. 09/598,552, which is assigned to the same assignee as the present application, which are each hereby incorporated by reference). A $MgF_2$ (or $CaF_2$, etc.) window (not shown) in front of the spectrograph slit 24 may be used to separate the evacuated spectrograph 14 from the inert gas pressurized beam line enclosure 10.

The preferred optical system is advantageously designed to minimize shifts between the spectra of the laser 6 and the hollow-cathode lamp 2. Such shifts might occur if the grating of the spectrograph 24 were illuminated differently by the two sources. The feasibility of the arrangement is heightened by a high luminosity of the laser 6, which permits exposures to be made with only a small fraction of the light from the laser 6. This feature allows a main beam from the laser 6 to be used in an industrial application, while a small beam portion is split off for simultaneous, on-line spectral analysis and control, e.g., using a feedback arrangement with a processor and wavelength and/or bandwidth tuning optics or other means such as gas control (see below).

After exiting from the laser 6 of FIGS. 1a–1b, or just after being split off from the main beam at a beamsplitter (not shown in FIGS. 1a–1b), a horizontal beam may be reflected by a turning mirror 16 of FIG. 1a coated for high reflectance at 157 nm, in any desired direction. Alternative geometries are possible, e.g., including a further mirror or turning the beam in the horizontal or vertical plane or not including any turning mirror, as shown at FIG. 1b.

The beam from the laser 6 is preferably directed toward the hollow-cathode lamp 2 by reflection from the front and back surfaces of a beamsplitter 8, which is preferably an uncoated $CaF_2$ plate 8. The beamsplitter 8 may alternatively comprise a substrate including another at least 157 nm material. The first surface encountered by the beam from the aperture 20 may alternatively include a partially reflective coating, while the other surface of the plate 8 may be uncoated or may have an antireflection or partially-reflective coating. In the embodiment of FIG. 1a, the beam is first scattered at a scattering plate 18 and goes through an aperture 20 before encountering the beam splitter 8. As mentioned above, if a diagnostic beam is first split off from the main beam of the laser 6 which continues to an industrial process, then the plate 18 and aperture 20 may also be advantageously disposed before the beam splitter 8 in the embodiment of FIG. 1b.

The window of the hollow-cathode lamp 2 which faces the enclosure 10 and the beamsplitter plate 8 may be covered by a mask 26, e.g., a copper disk having a 4-mm aperture at the center. The copper portion of the mask is advantageously highly absorbent at 157 nm, such that a large proportion of the laser light striking the surface of the mask 26 is absorbed and not reflected or transmitted. A fraction of the light passing through the aperture of the mask 26 is reflected by the $MgF_2$ window of the lamp 2. Some amount of this reflected fraction of the laser light then passes through the $CaF_2$ plate 8 and is incident at the spectrograph slit 24. Moreover, light emitted from the Pt/Ne lamp 2, including at least one and preferably two or more or even several relevant platinum transition lines of known wavelengths, passes through the mask 26 and through the plate 8 to be incident at the spectrographic slit 24, i.e., along a same beam path as the laser light reflected from the window of the lamp 2. Thus, light emitted from the hollow cathode lamp 2 and light generated by the laser 6 each appear to the grating or other optic such as an interferometric arrangement of the spectrograph 4 as emanating from a uniformly illuminated aperture in the copper mask 26.

This arrangement advantageously permits these two light sources 2 and 6 to be photographed or detected at the same time, thereby preventing shifts that may occur due to small changes in temperature during an exposure. Considering losses at the scattering plate 18, the aperture 20, the aperture 26, the $CaF_2$ plate 8 and the lamp window behind the mask 26, it is estimated that less than 0.01% of the light emitted by the laser 6 becomes eventually incident on the slit 24 of the spectrograph 4. Therefore, less than 0.01% of the light emitted from the laser 6 is actually needed to perform the spectral analysis, and the substantial amount of the beam may be used at the industrial process in the embodiment of FIG. 1b or is trapped at the light trap 22 in the embodiment of FIG. 1a.

Wavelength Measurements

Before each exposure or detection using the spectrograph, the energy of the laser is preferably measured and the exposure or detection time adjusted so as to obtain a weakly exposed image of at least the main line around 157.63 nm or the two principal lines, that is, the lines around 157.52 nm and 157.63 nm. This prevents shifts of the line position caused by overexposure. Pulse energies are preferably around 10 mJ. The absolute calibration may be performed during a downtime of the industrial processing, so that a reduced repetition rate may be used, e.g., around 10 Hz. Exposure times for the laser may be varied from 2 s to 30 s, with a typical time being 10 s. These short exposures may be made at the midpoint of the Pt—Ne hollow cathode exposure by opening and closing the laser shutter. Some longer exposures of the laser may be made to record spectra of the weaker lines. Typical times for these may be approximately 7 min.

Exposures may be made with different laser operating conditions as follows: (a) the discharge voltage may be varied, e.g., from 1800 to 2400 V, (b) the temperature of the gas in the laser tube may be varied, e.g., from 22° to 38° C., (c) the partial pressure of the 5% $F_2$ in He primary gas may be varied, e.g., from 2 kPa to 14 kPa, (d) the partial pressure of Ne may be varied, e.g., from 0 to 260 kPa, (e) the total gas pressure may be varied, e.g., from 250 to 400 kPa, and (f) the history of the laser gas may be varied by use of both fresh gas fills and gas aged passively (e.g., with the laser turned off overnight or over some period of time) or actively (e.g., following an extended period of operation, e.g., totaling a million pulses as a benchmark). The Pt—Ne hollow-cathode lamp 2 may be operated at a current of 40 mA. An exposure time for the lamp may be around five minutes.

Spectrograms

The spectrograms may be measured on a high-precision semiautomatic comparator with a setting accuracy of 1 μm. The line positions may be reduced to wavelengths by using a quadratic fit to several of the platinum standard lines. For example, 14 Pt lines in the second order may be used for the calibration. The wavelengths of most of the Pt lines are Ritz-type values (optimized values determined from the experimental level values) with uncertainties of approximately 0.0001 nm. The standard deviation of the individual fits is typically 0.00005 nm.

Intensities for the laser lines may be estimated visually from plate blackening or at a display connected to the array detector. Because sequential exposures of the laser may be taken for different lengths of time, by comparing the blackening obtained for different times, semiquantitative estimates of the relative intensities may be obtained.

Figure 2:
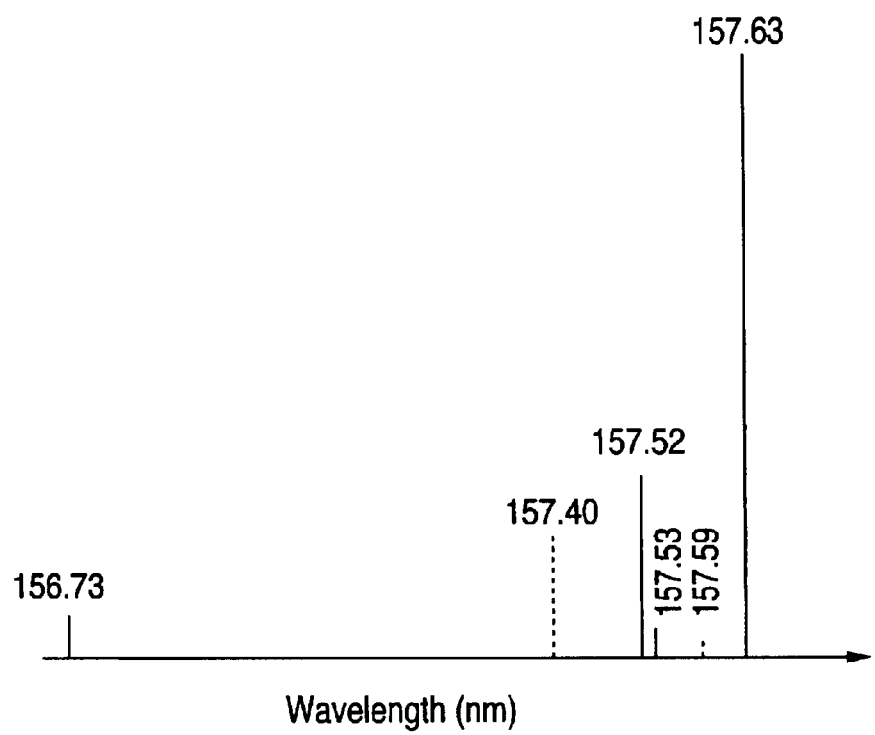
FIG. 2 illustrates the observed lasing lines of for a molecular fluorine laser.

FIG. 2 is a schematic drawing of the observed lasing lines of the molecular fluorine laser 6. The spectral lines rendered with dashed lines were observed in the experiments reported at Sansonetti et al., cited above, only with high partial pressures of Ne in the laser gas mixture. Relative intensities are not to scale in FIG. 2. Table 1 shows measured wavelengths for lasing lines when the gas mixture of the $F_2$ laser includes $F_2$ (5%) in He at 5 kPa, Ne at 5 kPa, and He at 250 kPa.

TABLE I

| Relative Intensity | Wavelength (nm)[a] |
|---|---|
| 36[b] | 156.73519(10) |
| 140[c,d] | 157.40231(10) |
| 400 | 1.57.52433(110) |
| 2[d] | 157.52988(10) |
| 1[c,d] | 157.5970(5) |
| 2000 | 157.63094(10) |

[a]The uncertainties are listed in parentheses and are given at the one standard deviation level.
[b]Not observed in gas mixtures with high partial pressure of Ne.
[c]Not observed with a standard gas mixture. These lines appear only with high partial pressure of Ne.
[d]Newly observed lasing line.

Uncertainties given in Table 1 are estimated at the one standard deviation level. In addition to the wavelengths of three lasing lines already known in the region around 157 nm, the wavelengths of three additional lasing lines, indicated by footnote d in Table 1, are also provided. Particularly for industrial uses such as for photolithography, mask writing, investigation or repair, or wafer illumination for inspection, etc., the main line at 157.63 nm is preferably selected by optics from the other lines summarized at Table 1 (see, e.g., U.S. Pat. Nos. 6,345,065 and 6,154,470, which are hereby incorporated by reference). These results were validated as described at Sansonetti, et al., Applied Optics, Vol. 40, No. 12, 1974–1978 (Apr. 20, 2001), which is hereby incorporated by reference.

In accordance with preferred embodiments, the wavelength of the main line around 157.63 nm (and/or another selected line or lines) may be varied and/or controlled by varying and/or controlling operating conditions of the laser 6. Among the operating conditions that were varied in our experiments are input driving voltage, molecular fluorine partial pressure, buffer gas partial pressure, and temperature of the gas mixture. FIGS. 3–6 respectively show measured wavelengths of the main line versus several values of input driving voltage (FIG. 3), gas mixture temperature (FIG. 4), partial pressure of the 5% $F_2$ in He part of the gas mixture (FIG. 5), and He buffer gas pressure (FIG. 6). The error bars in FIGS. 3–6 represent relative uncertainties of the measurements excluding the contribution to the uncertainty of the wavelength standards, which is common to all the observations. Note that no dependence of the laser wavelength on aging of the laser gas, either passively or with the laser in operation, was observed.

Figure 3:
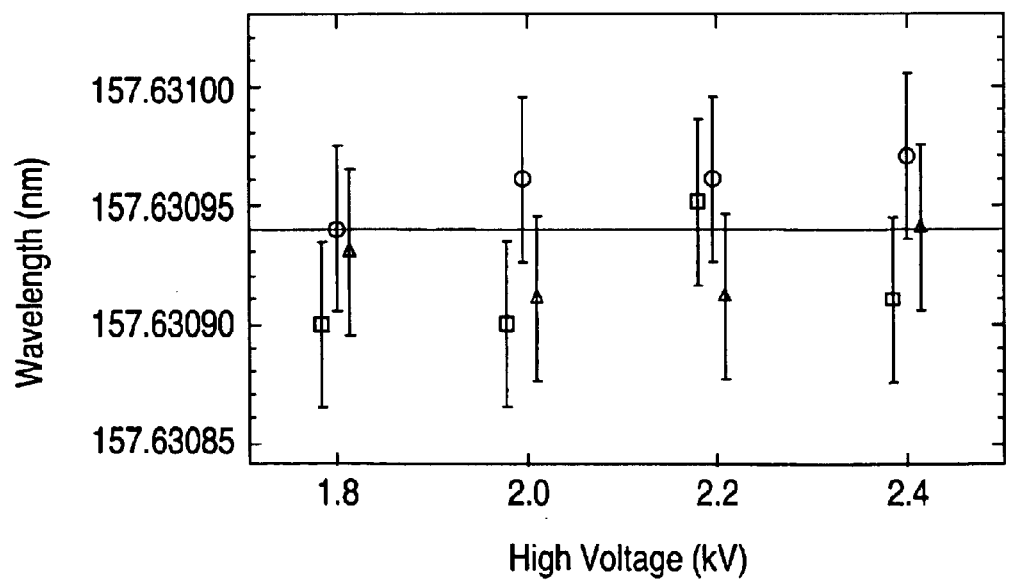
FIG. 3 is a chart illustrating variation of the $F_2$ emission line with discharge voltage for the line around 157.63095 nm.

Results are plotted in FIG. 3 for three independent tests: open squares, data set 1; open circles, data set 2; and solid triangles, data set 3. The horizontal line represents the adopted average wavelength, 157.63094 nm, based on all observed values for the standard gas mixture. In general, FIG. 3 indicates that no statistically significant dependence of wavelength on driving voltage exists for the 1800–2400-V range.

Figure 4:
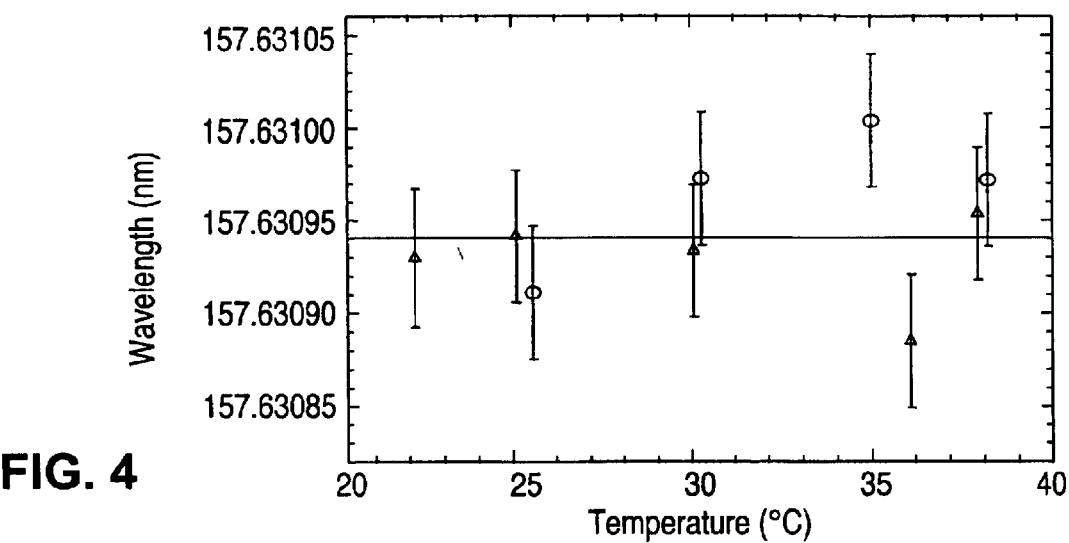
FIG. 4 is a chart illustrating variation of wavelength with laser gas temperature for the 157.63095 nm line.

Results are plotted in FIG. 4 for two independent tests: open circles, data set 1; and solid triangles, data set 2. The horizontal line represents the adopted average wavelength, 157.63094 nm, based on all observed values for the standard gas mixture. In general, FIG. 4 indicates that no dependence of wavelength on the average temperature of the laser gas within the tube exists for the 22–38° C. range.

Figure 5:
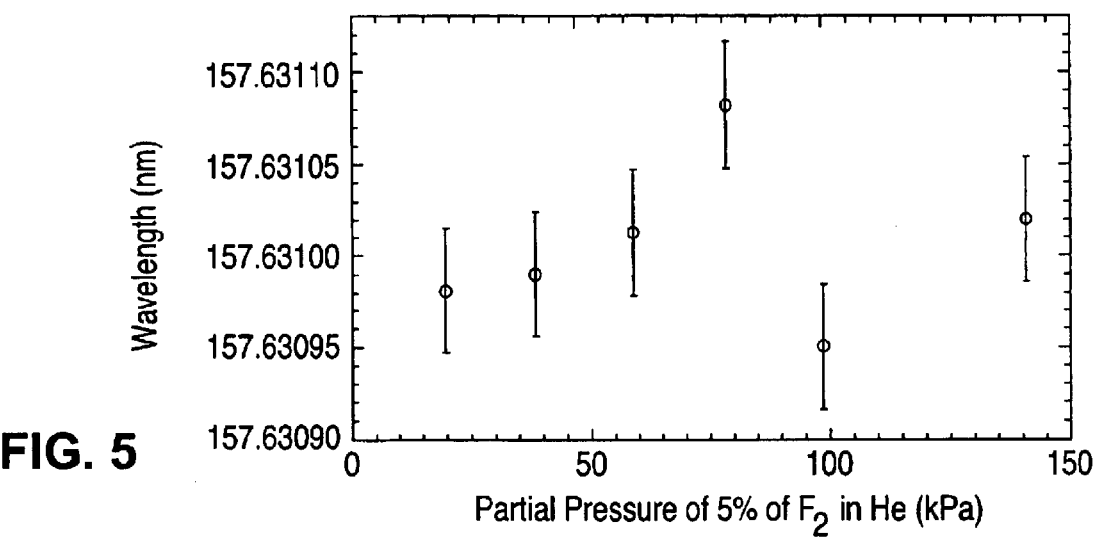
FIG. 5 is a chart illustrating variation of wavelength with partial pressure of primary gas fill for the 157.63095 nm line.
Figure 6:
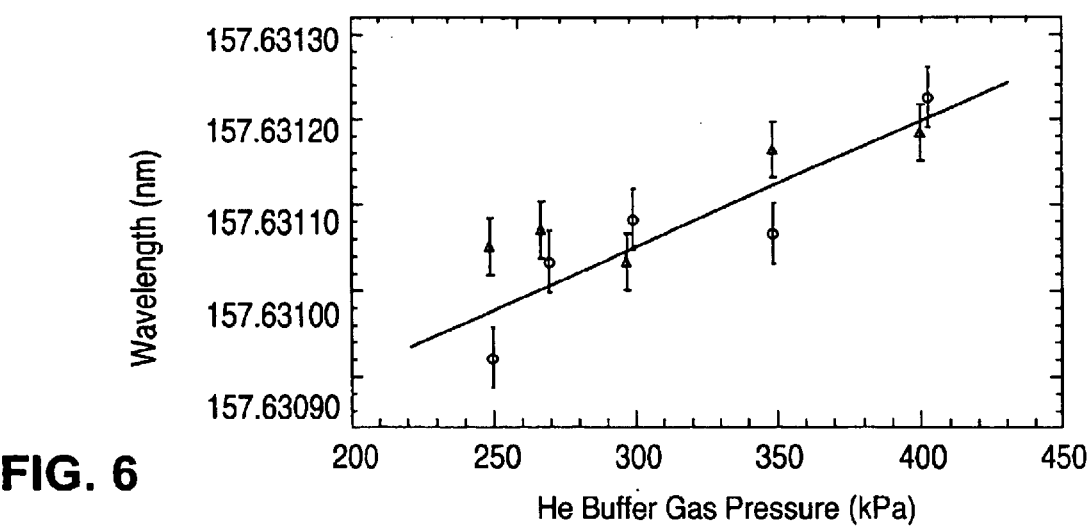
FIG. 6 is a chart illustrating variation of wavelength with helium buffer gas pressure for the 157.63095 nm line.

FIG. 5 shows plots of the wavelength of the main line versus the partial pressure of the primary gas fill (5% $F_2$ in He). These values were measured with a He pressure of 270 kPa and have a slightly greater average wavelength than those observed with the standard conditions. The dependence of wavelength on partial pressure of the primary fill gas (5% $F_2$ in He) was tested over the 1.5–14-kPa range with the partial pressures of Ne and He fixed at 5 and 270 kPa, respectively. No significant dependence was observed to within the accuracy of the measurements.

FIG. 6 shows plots of the wavelength of the main line versus He buffer gas pressure. Dependence of the wavelength on the partial pressure of the He buffer gas was tested over the 250–400-kPa range for the primary gas and Ne at equal partial pressures of 5 and 7 kPa. The solid line represents a shift rate of +1.5×10$^{-3}$ pm/kPa that is based on the two sets of data shown and on data for the 157.52-nm line. That is, the wavelengths were found to increase with He pressure at a rate of approximately +1.5×10$^{-3}$ pm/kPa, as illustrated at FIG. 6.

Although not shown in a plot, reduction of the He partial pressure in favor of increased Ne partial pressure at constant total pressure was observed to produce a systematic decrease in the wavelengths. For a total buffer gas pressure of approximately 270 kPa, the plot at FIG. 6 shows a linear dependence of change of wavelength with increased Ne partial pressure. The plot at FIG. 6 also shows an approximate shift rate in wavelength over the range of relative partial pressures of He and Ne of −0.0004 nm/250 kPa, or about −1.5×10$^{-6}$ nm/kPa, with Ne partial pressure

Spectral Width of Lasing Lines

To obtain an estimate of the spectral width of the line at 157.63 nm, a series of exposures may be taken of this line in third order of the grating. The plate factor may be 0.0251 nm/mm. For these exposures a 9-μm slit width may be used. Based on six independent observations of the 157.63-nm line at weak-to-moderate exposures, it was found the full width at half-maximum (FWHM) of the recorded line to be 34±1 μm, corresponding to a FWHM of 0.85±0.03 pm, i.e., without further line-narrowing and at the pressures provided above. This width results from the convolution of the profile of the laser line with the instrumental function. For a 9-μm slit the minimum possible width of the instrumental function is 0.23 pm. It was also observed that the narrowest lines from the Pt lamp have widths of approximately 23 µm. This sets a limit of 0.58 pm on the maximum width of the instrumental function. By using these limiting values for the instrumental width and by assuming that the instrumental and laser linewidths combine in quadrature, it was estimated that the FWHM of the lasing line is characteristically between 0.62 and 0.82 pm. Prior to these observations, the laser bandwidth was believed to be greater than 1 pm (see J. A. McClay and A. S. L. McIntyre, "157 nm Optical Lithography: the Accomplishments and the Challenges," Solid State Technol. 42, 57–68 (1999)).

In accordance with preferred embodiments, the bandwidth of the main line around 157.63 nm (and/or another selected line or lines) may be varied and/or controlled by varying and/or controlling operating conditions of the laser 6. Among the operating conditions that may be varied is the total pressure of the gas mixture that is approximately the total buffer gas pressure. This feature is described in more detail below with reference to FIGS. 10 and 11, and at U.S. patent application Ser. No. 09/883,128, which is assigned to the same assignee as the present application and is hereby incorporated by reference.

Overall Laser System

Figure 7:
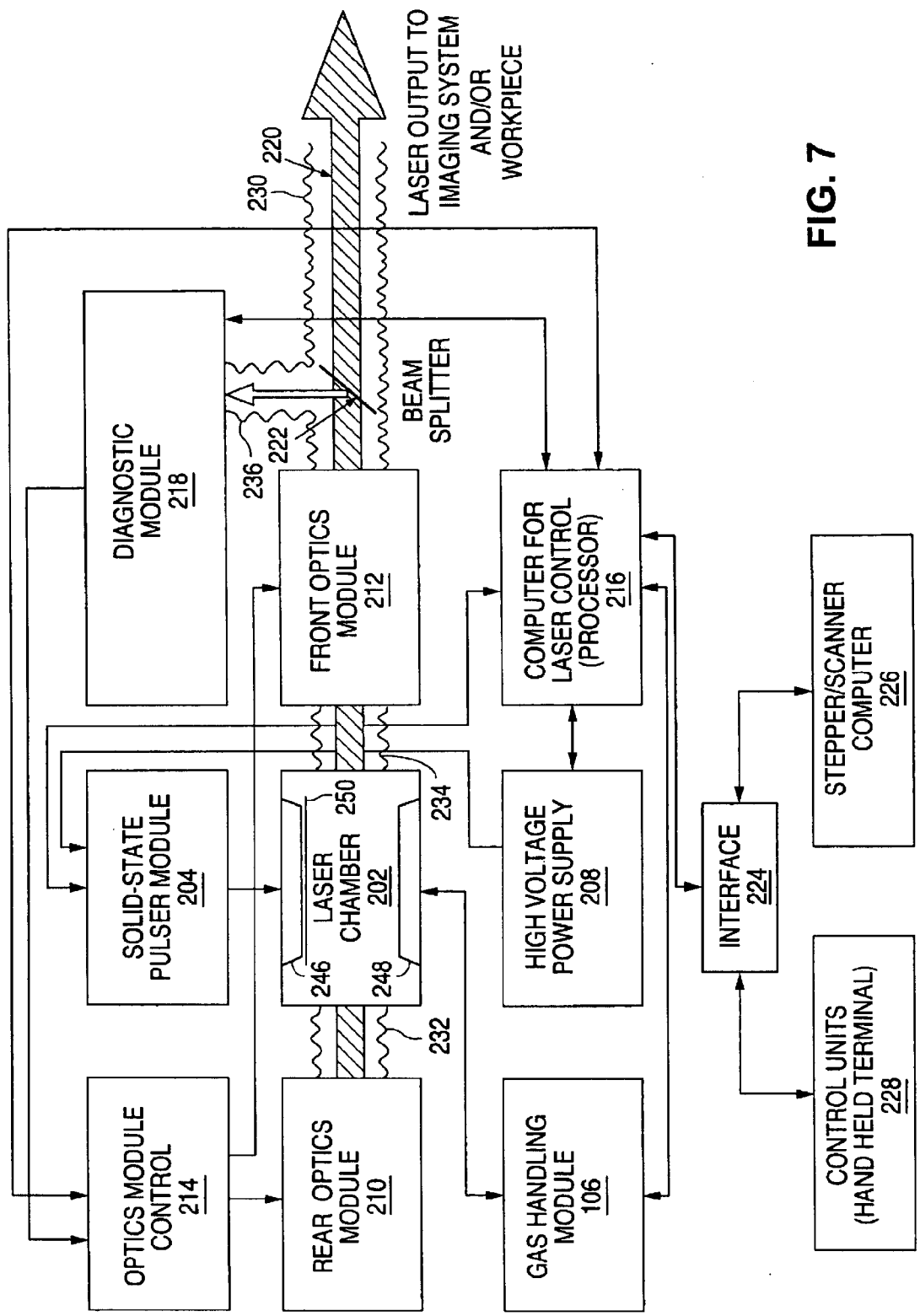
FIG. 7 schematically illustrates a molecular fluorine laser system, or alternatively an ArF laser system.

FIG. 7 schematically illustrates an overall molecular fluorine ($F_2$) laser system according to a preferred embodiment. Referring to FIG. 7, a molecular fluorine laser system is schematically shown according to a preferred embodiment (some of the features of the preferred embodiment set forth herein may also be applied to excimer lasers such as ArF and KrF excimer lasers, and even some to EUV lithography around 11 nm to 15 nm, and so some description of alternatives for these lasers is described below). The preferred gas discharge laser system is a VUV laser system, such as a molecular fluorine ($F_2$) laser system. Alternative configurations for laser systems for use in such other industrial applications as TFT annealing, photoablation, micromachining and/or other applications mentioned herein or as understood by those skilled in the art, e.g., include configurations understood by those skilled in the art as being similar to and/or modified from the system shown in FIG. 7 to meet the requirements of that application. For this purpose, alternative configurations are described at U.S. patent application Ser. Nos. 09/512,417, 09/694,246, 09/712,877, 09/574,921, 09/738,849, 09/718,809, 09/629,256, 09/712,367, 09/771,366, 09/715,803, 09/738,849, 60/202,564, 60/204,095, 09/741,465, 09/574,921, 09/734,459, 09/741,465, 09/686,483, 09/715,803, and 09/780,124, and U.S. Pat. Nos. 6,393,037, 6,381,256, 6,345,065, 6,298,080, 6,005,880, 6,061,382, 6,020,723, 5,946,337, 6,014,206, 6,157,662, 6,154,470, 6,160,831, 6,160,832, 5,559,816, 4,611,270, 5,761,236, 6,212,214, 6,154,470, 6,327,290, 6,285,701, 6,272,158, 6,269,110 and 6,157,662, and EUV systems are set forth at U.S. patent application Ser. Nos. 60/281,446, 09/693,490 and 60/312,277, and references cited in those applications, each of which is assigned to the same assignee as the present application and is hereby incorporated by reference.

The system shown in FIG. 7 generally includes a laser chamber 202 (or laser tube including a heat exchanger and fan for circulating a gas mixture within the chamber 202 or tube, see, e.g., U.S. Pat. No. 6,414,978, which is hereby incorporated by reference) having a pair of main discharge electrodes 246,248 and one or more preionization electrodes 250 connected with a solid-state pulser module 204, and a gas handling module 206. The gas handling module 206 has a valve connection to the laser chamber 202 so that active halogen and rare gases and buffer gases, and optionally a gas additive, may be injected or filled into the laser chamber 202, preferably in premixed forms (see U.S. patent application Ser. No. 09/513,025, which is assigned to the same assignee as the present application, and U.S. Pat. No. 4,977,573, which are each hereby incorporated by reference) for ArF, XeCl and KrF excimer lasers, among others, and halogen and buffer gases, and any gas additive, for the $F_2$ laser. For the high power XeCl laser, the gas handling module may or may not be present in the overall system. The solid-state pulser module 204 is powered by a high voltage power supply 208. A thyratron pulser module may alternatively be used. The laser chamber 202 is surrounded by optics module 210 (or the rear optics module ROM) and optics module 212 (or the front optics module FOM), forming a resonator. The optics modules may include only a highly reflective resonator reflector in the rear optics module 210 and a partially reflecting output coupling mirror in the front optics module 212, such as is preferred for the high power XeCl laser, wherein line-narrowing is not desired. The optics modules 210 and 212 may be controlled by an optics control module 214, or may be alternatively directly controlled by a computer or processor 216, particular when line-narrowing optics are included in one or both of the optics modules 210, 212, such as is preferred when KrF, ArF or $F_2$ lasers are used for optical lithography.

The processor 216 for laser control receives various inputs and controls various operating parameters of the system. A diagnostic module 218 (note that even though the diagnostic module 218 is shown as a single block in FIG. 7, this is illustrative and multiple modules may be used for diagnostic purposes that are not coupled together or included within a single structural module 218, although multiple extra-cavity modules, e.g., wavemeter, energy detector, wavelength calibration module, etc., may be enclosed in a common housing), receives and measures one or more parameters, such as pulse energy, average energy and/or power, and preferably wavelength, of a split off portion of the main beam 220 via optics for deflecting a small portion of the beam toward the module 218, such as preferably a beam splitter module 222 (see, e.g, U.S. patent application Ser. Nos. 09/598,552 and 09/718,809, which are assigned to the same assignee as the present application and are hereby incorporated by reference). The beam 220, which preferably passes through (or is blocked by) a shutter module (not shown) is preferably the laser output to an imaging system (not shown) and ultimately to a workpiece (also not shown) such as particularly for lithographic applications, and may be output directly to an application process. The laser control computer 216 may communicate through an interface 224 with a stepper/scanner computer, other control units 226, 228 and/or other external systems.

Laser Chamber

The laser chamber 202 contains a laser gas mixture and includes one or more preionization electrodes 250 in addition to the pair of main discharge electrodes 246,248. Preferred main electrodes 246,248 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units may include corona-type units that emit UV radiation in a direction of the discharge region between the main electrodes 246, 248, such as including a first electrode within a dielectric tube and a counter-electrode outside and near the outer surface of the tube, or sliding surface units, such as include a dielectric surface disposed between a pair of electrodes for allowing a sliding surface discharge to move along the sliding surface and emit UV radiation directed at the discharge region, are set forth at U.S. patent applications Ser. No. 09/692,265 (particularly preferred for KrF, ArF, $F_2$ lasers), Ser. Nos. 09/532,276, 09/922,241 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

Solid State Pulser Module

The solid-state or thyratron pulser module 204 and high voltage power supply 208 supply electrical energy in compressed electrical pulses to the preionization and main electrodes 246,248,250 within the laser chamber 202 to energize the gas mixture. Components of the preferred pulser module and high voltage power supply may be described at U.S. patent application Ser. Nos. 09/640,595, 60/198,058, 60/204,095, 09/432,348 and 09/390,146, and 60/204,095, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

The laser chamber 202 is sealed by windows substantially transparent to the wavelengths of the emitted laser radiation 220. The windows may be Brewster windows or may be aligned at another angle, e.g., 5°, to the optical path of the resonating beam, or may be optical components that serve additional functions such as an output coupler and/or wavefront compensation lens or mirror. One of the windows may serve to output couple the beam or as a highly reflective resonator reflector on the opposite side of the chamber 202 as the beam is outcoupled, and one or both of the windows may serve other functions such as being a prism or lens for line-narrowing and/or line-selection or for collimating the beam or correcting wavefront curvature.

Laser Resonator

The laser resonator which surrounds the laser chamber 202 containing the laser gas mixture includes optics module 210 preferably including line-selection optics for a line-selected molecular fluorine laser such as for photolithography, which may be replaced by a high reflectivity mirror or the like in a laser system wherein either line-narrowing is not desired (for TFT annealling, e.g.), or if line narrowing is performed at the front optics module 212, or if a spectral filter external to the resonator is used, or if the line-narrowing optics are disposed in front of the HR mirror, for narrowing the bandwidth of the output beam. In accord with a preferred embodiment of a molecular fluorine laser system, optics for selecting one of multiple lines around 157 nm may be used, e.g., one or more dispersive prisms, interferometric devices or birefringent plates or blocks, wherein additional line-narrowing optics for narrowing the selected line may be included or left out. The total gas mixture pressure may be lower than conventional systems, e.g., lower than 3 bar, for producing the selected line at a narrow bandwidth such as 0.5 pm or less even if additional line-narrowing optics are not used (see U.S. patent application Ser. Nos. 09/883,128 and 09/923,770, which are assigned to the same assignee as the present application and are hereby incorporated by reference).

Either no optics or merely a simple, not very lossy optical configuration for line-selection may be all that is included. That is, the preferred embodiment may not have additional line-narrowing optics in the laser resonator, or includes only line-selection optics for selecting the main line at $\lambda_1 \approx 157.629$ nm (see above) and suppressing any other lines around 157 nm that may be naturally emitted by the $F_2$ laser. Therefore, in one embodiment, the optics module 210 has only a highly reflective resonator mirror, and the optics module 212 has only a partially reflective resonator reflector. In another embodiment, suppression of the other lines (i.e., other than $\lambda_1$) around 157 nm is performed preferably according to any of the embodiments described above or otherwise, e.g., by an outcoupler having a partially reflective inner surface and being made of a block of birefringent material or a VUV transparent block with a coating, either of which has a transmission spectrum which is periodic due to interference and/or birefringence, and has a maximum at $\lambda_1$ and a minimum at a secondary line (see U.S. patent application Ser. No. 09/883,127 and U.S. Pat. No. 6,345,065, which are assigned to the same assignee as the present application and are hereby incorporated by reference). In another embodiment, optics such as a dispersive prism or prisms may be used for line-selection only, and not for narrowing of the main line at $\lambda_1$. Other line selection embodiments are set forth at U.S. patent application Ser. No. 09/657,396 and U.S. Pat. Nos. 6,345,065 and 6,381,256, which are assigned to the same assignee as the present application and are hereby incorporated by reference. The gas mixture pressure may be low enough to enable a narrow bandwidth, e.g., below 0.5 pm, even without further narrowing of the main line at $\lambda_1$ using additional optics, although such additional optics may be used, particularly in embodiments wherein an amplifier is used to increase the energy of the line-narrowed laser beam.

Optics module 212 preferably includes an output coupler 220 (or means for outcoupling the beam), such as a partially reflective resonator reflector. The beam 220 may be otherwise outcoupled such as by an intra-resonator beam splitter or partially reflecting surface of another optical element, and the optics module 212 would in this case include a highly reflective mirror. The optics control module 214 preferably controls the optics modules 210 and 212 such as by receiving and interpreting signals from the processor 216, and initiating realignment, gas pressure adjustments in the modules 210, 212, or reconfiguration procedures.

Diagnostic Module

After a portion of the output beam 220 passes the outcoupler of the optics module 212, that output portion preferably impinges upon a beam splitter module 222 which includes optics for deflecting a portion of the beam to the diagnostic module 218, or otherwise allowing a small portion of the outcoupled beam to reach the diagnostic module 218, while a main beam portion 220 is allowed to continue as the output beam 220 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 218, as described above, e.g., a wavemeter and an absolute wavelength calibration module may be separate from each other and from an energy detector module. A holographic beam sampler, transmission grating, partially transmissive reflection diffraction grating, grism, prism or other refractive, dispersive and/or transmissive optic or optics may also be used to separate a small beam portion from the main beam 220 for detection at the diagnostic module 218, while allowing most of the main beam 220 to reach an application process directly or via an imaging system or otherwise. These optics or additional optics may be used to filter out visible radiation such as the red emission from atomic fluorine in the gas mixture from the split off beam prior to detection (see the Ser. No. 09/598,552 application, mentioned above, and U.S. patent application Ser. No. 09/712,877, which is assigned to the same assignee as the present application and is hereby incorporated by reference).

The output beam 220 may be transmitted at the beam splitter module while a reflected beam portion is directed at the diagnostic module 218, or the main beam 220 may be reflected, while a small portion is transmitted to the diagnostic module 218. The portion of the outcoupled beam that continues past the beam splitter module 222 is the output beam 220 of the laser, which propagates toward an industrial or experimental application such as an imaging system and workpiece for photolithographic applications.

The diagnostic module 218 preferably includes at least one energy detector. This detector measures the total energy of the beam portion that corresponds directly to the energy of the output beam 220 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 222 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 218 is preferably a wavelength and/or bandwidth detection component such as a monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference. The bandwidth may be monitored and controlled in a feedback loop including the processor 216 and gas-handling module 206. The total pressure of the gas mixture in the laser tube 202 may be controlled to a particular value for producing an output beam at a particular bandwidth. Any of these references may be combined with what is described above with reference to FIGS. 1–6 and below with reference to FIGS. 8a-11.

Other components of the diagnostic module may include a pulse shape detector or ASE detector, such as are described at U.S. Pat. Nos. 6,243,405 and 6,243,406, respectively, which are hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosures

Particularly for the preferred molecular fluorine laser system, an enclosure 230 preferably seals the beam path of the beam 220 such as to keep the beam path free of photoabsorbing species and/or scattering particulate species. Smaller enclosures 232 and 234 preferably seal the beam path between the chamber 202 and the optics modules 210 and 212, respectively, and a further enclosure 236 is disposed between the beam splitter 222 and the diagnostic module 218. Preferred enclosures are described in detail in U.S. patent application Ser. Nos. 09/598,552, 09/594,892 and 09/131,580, which are assigned to the same assignee and are hereby incorporated by reference, and U.S. Pat. Nos. 6,399,916, 6,327,290, 6,345,065, 6,219,368, 5,559,584, 5,221,823, 5,763,855, 5,811,753 and 4,616,908, all of which are hereby incorporated by reference. The enclosure may be evacuated or purged with an inert gas. The optics modules 210 and 212, as well as any of the other modules, may themselves also be maintained substantially free of photoabsorbing species preferably as described above using a purge gas flow mechanism, wherein one or both modules may alternatively be evacuated, particularly the rear optics module 210, or the front optics module if the line-narrowing is performed there (see U.S. patent application Ser. No. 10/112,660, which is assigned to the same assignee as the present application and is hereby incorporated by reference), and alternatively one or more modules may be filled with a stagnant (i.e., non-flowing) inert gas and sealed from the outer atmosphere.

Processor Control

The processor or control computer 216 receives and processes values of some of the pulse shape, energy, ASE, energy stability, energy overshoot for burst mode operation, wavelength, spectral purity and/or bandwidth, among other input or output parameters of the laser system and output beam. The processor 216 also controls the line narrowing module to tune the wavelength and/or bandwidth or spectral purity, and controls the power supply and pulser module 204 and 208 to control preferably the moving average pulse power or energy, such that the energy dose at points on the workpiece is stabilized around a desired value. In addition, the computer 216 controls the gas-handling module 206 which includes gas supply valves connected to various gas sources. Further functions of the processor 216 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 7, the processor 216 preferably communicates with the solid-state or thyratron pulser module 204 and HV power supply 208, separately or in combination, the gas handling module 206, the optics modules 210 and/or 212, the diagnostic module 218, and an interface 224. The laser resonator which surrounds the laser chamber 202 containing the laser gas mixture includes optics module 210 including line-narrowing optics for a line narrowed excimer or molecular fluorine laser, which may be replaced by a high reflectivity mirror or the like in a laser system wherein either line-narrowing is not desired, or if line narrowing is performed at the front optics module 212, or an spectral filter external to the resonator is used for narrowing the linewidth of the output beam.

Gas Mixture

The laser gas mixture is initially filled into the laser chamber 202 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,662 and 4,977,573 and U.S. patent application Ser. Nos. 09/513,025, 09/447,882, 09/418,052, and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Although the preferred embodiments herein are particularly drawn to use with a $F_2$ laser, some gas replenishment actions are described for gas mixture compositions of other systems such as ArF, KrF, and XeCl excimer lasers, wherein the ideas set forth herein may also be advantageously incorporated into those systems.

Also, the gas composition for the $F_2$ laser in the above configurations uses either helium, neon, or a mixture of helium and neon as a buffer gas. The concentration of fluorine in the buffer gas preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

In one embodiment, a mixture of 5% $F_2$ in Ne with He as a buffer gas is used, although more or less He or Ne may be used. The total gas pressure may be advantageously adjustable between 1500 and 4000 mbar for adjusting the bandwidth and/or spectral purity of the laser, and also optionally for adjusting the wavelength and/or energy of the beam (see the Ser. Nos. 09/883,128 and 09/780,120 applications, mentioned above). The partial pressure of the buffer gas is preferably adjusted to adjust the total pressure, such that the amount of molecular fluorine in the laser tube is not varied from an optimal, pre-selected amount, although the molecular fluorine is otherwise replenished as its concentration deteriorates due to the corrosive action of the aggressive halogen. The bandwidth and spectral purity are shown to advantageously decrease with decreased He and/or Ne buffer gas in the gas mixture. Thus, the partial pressure of the He and/or Ne in the laser tube is adjustable to adjust the bandwidth of the laser emission.

Gas Mixture Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 206 preferably including a vacuum pump, a valve network and one or more gas compartments. The gas-handling module 206 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214 and 5,396,514 and U.S. patent application Ser. Nos. 09/447,882, 09/418,052, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Total pressure adjustments in the form of releases of gases or reduction of the total pressure within the laser tube 202 may also be performed. Total pressure adjustments may be followed by gas composition adjustments if it is determined that, e.g., other than the desired partial pressure of halogen gas is within the laser tube 202 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in U.S. Pat. No. 6,389,052, which is hereby incorporated by reference. As an example, the gas handling unit 206 connected to the laser tube 202 either directly or through an additional valve assembly, such as may include a small compartment for regulating the amount of gas injected (see the '459 application), may include a gas line for injecting a premix A including 1% $F_2$:99% Ne or other buffer gas such as He, and another gas line for injecting a premix B including 1% rare gas:99% buffer gas, for a rare gas-halide excimer laser, wherein for a $F_2$ laser premix B is not used. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 202 via the valve assembly, the fluorine concentration in the laser tube 202 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, and any and all other gas replenishment actions are initiated and controlled by the processor 216 which controls valve assemblies of the gas handling unit 206 and the laser tube 202 based on various input information in a feedback loop. These gas replenishment procedures may be used in combination with gas circulation loops and/or window replacement procedures to achieve a laser system having an increased servicing interval for both the gas mixture and the laser tube windows.

The halogen concentration, or the total amount of halogen in mbar, in the gas mixture is maintained constant during laser operation by gas replenishment actions by replenishing the amount of halogen in the laser tube for the preferred molecular fluorine laser herein, such that these gases are maintained in a same predetermined ratio as are in the laser tube 202 following a new fill procedure, or such that the molecular fluorine is maintained at a same partial pressure as is present in the laser tube 202 after a new fill procedure. In addition, gas injection actions such as $\mu$Hls as understood from the '882 application, mentioned above, may be advantageously modified into micro gas replacement procedures, such that the increase in energy of the output laser beam may be compensated by reducing the total pressure. In contrast, or alternatively, conventional laser systems would reduce the input driving voltage so that the energy of the output beam is at the predetermined desired energy. In this way according to a preferred embodiment, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube 202. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). Although the preferred embodiments have already been set forth above, these exemplary embodiments may also be used, e.g., for selecting the primary line $\lambda_1$ only, or may be used to provide additional line narrowing as well as performing line-selection when a very narrow linewidth is desired, or the resonator may include optics for line-selection and additional optics for line-narrowing of the selected line, and line-narrowing may be provided by controlling (i.e., reducing) the total pressure (see below with reference to FIGS. 10–11, and U.S. patent application Ser. No. 09/883,128, which is assigned to the same assignee and is hereby incorporated by reference). Exemplary line-narrowing optics contained in the optics module 210 include one or more full or half dispersion prisms, a beam expander, an interferometric device such as an etalon or otherwise as described in the U.S. patent application Ser. No. 09/715,803, incorporated by reference above, and/or a diffraction grating, wherein the grating would produce a relatively higher degree of dispersion than the prisms although generally exhibiting somewhat lower efficiency than the dispersion prism or prisms at 157 nm (wherein the grating is preferred for use with the ArF laser due to its greater dispersion being advantageous for narrowing the 400 pm characteristic broadband emission spectrum of the ArF laser and because the grating has greater efficiency at 193 nm), for a narrow band laser such as is used with a refractive or catadioptric optical lithography imaging system. As mentioned above, the front optics module 212 may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 210, the grating may be replaced with a highly reflective mirror, and a lower degree of dispersion may be produced by a dispersive prism or alternatively no line-narrowing or line-selection may be performed in the rear optics module 210. In the case of using an all-reflective imaging system, the laser may be configured for semi-narrow band operation such as having an output beam linewidth in excess of 0.6 pm, depending on the characteristic broadband bandwidth of the laser, such that additional line-narrowing of the selected line would not be used, either provided by optics or by reducing the total pressure in the laser tube.

A beam expander, if used, would preferably include one or more beam expansion prisms. The beam expander may include other beam expanding optics such as a lens assembly or a converging/diverging lens pair, and the beam expander may employ reflective optics as is understood from Babinet's principle. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470 patent, each of which is assigned to the same assignee and is hereby incorporated by reference. The grating or dispersion prism may be used both for dispersing the beam for achieving narrow bandwidths and also for retroreflecting the beam back toward the laser tube. Alternatively, a highly reflective mirror or other reflective surface is positioned after the grating or prism which may receive a reflection from the grating or refract through the prism, etc., and reflects the beam back toward the prism or grating, or a mirror may be disposed between the prism or grating and a beam expander or wavefront compensation optic, and a Littman configuration may be used, or the grating may be a transmission grating. One or more dispersive prisms may also be used, and more than one etalon or other interferometric device may be used.

One or more apertures may be included in the resonator for blocking stray light and matching the divergence of the resonator (see the U.S. Pat. No. 6,285,701, mentioned above). As mentioned above, the front optics module 212 may include line-narrowing optics (see the Ser. Nos. 09/715,803, 09/738,849 and 09/718,809 applications, each being assigned to the same assignee as the present application and hereby incorporated by reference), including or in addition to the outcoupler element.

Depending on the type and extent of line-narrowing and/or selection and tuning that is desired, and the particular laser that the line-narrowing optics are to be installed into, there are many alternative optical configurations that may be used other than those specifically mentioned herein. For this purpose, those described in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the other patents and/or patent applications mentioned above and below herein, may be consulted to obtain a line-narrowing configuration that may be used with a preferred laser system herein, and each of these patent references is each hereby incorporated by reference into the present application.

As discussed, there may be no line-narrowing optics in the resonator, in some embodiments, that are subject to degradation or produce losses, wherein alternatively, only optics to select a single line (i.e., $\lambda_1$) may be used in a $F_2$ laser system. However, line-narrowing optics may be used for further line-narrowing in combination with the line-narrowing and/or bandwidth adjustment that may be performed by adjusting/reducing the total pressure in the laser chamber (for the ArF laser, and for the KrF laser, line-narrowing optics at least including a grating and beam expander, and optionally an interferometric device, are particularly preferred, e.g., see U.S. patent application Ser. Nos. 09/712,367, 09/715,803 and 60/280,398, which are assigned to the same assignee as the present application and are hereby incorporated by reference). For example, a natural bandwidth may be adjusted to 0.5 pm by reducing the partial pressure of the buffer gas to 1000–1500 mbar. The bandwidth could than be reduced to 0.2 pm or below using line-narrowing optics either in the resonator or external to the resonator.

Optical Materials

In all of the above and below embodiments, the material used for any dispersive prisms, the prisms of any beam expanders, etalons, laser windows and the outcoupler is preferably one that is highly transparent at the 157 nm output emission wavelength of the molecular fluorine laser. The materials are also capable of withstanding long-term exposure to ultraviolet light with minimal degradation effects, particularly at high repetition rates such as 2, 4 or 8 kHz or higher. Examples of such materials are $CaF_2$, $MgF_2$, $BaF_2$, LiF and $SrF_2$, and in some cases fluorine-doped quartz may be used. As mentioned above, $MgF_2$ is preferably used when a birefringent material is desired, and $CaF_2$ is the preferred non-birefringent material. Also, in all of the embodiments, many optical surfaces, particularly those of the prisms, may or may not have an anti-reflective coating on one or more optical surfaces, in order to minimize reflection losses and prolong their lifetime.

Power Amplifier

A line-narrowed oscillator, e.g., a set forth above, may be followed by a power amplifier for increasing the power of the beam output by the oscillator. Preferred features of the oscillator-amplifier set-up are set forth at U.S. Pat. No. 6,381,256 and U.S. patent application Ser. No. 09/923,770, which are assigned to the same assignee and are hereby incorporated by reference. The amplifier may be the same or a separate discharge chamber 202. An optical or electrical delay may be used to time the electrical discharge at the amplifier with the reaching of the optical pulse from the oscillator at the amplifier. The molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts). An attenuator, which may be a variable attenuator, may be included after the oscillator, preferably before the amplifier (see U.S. patent application Ser. No. 60/309,939, which is assigned to the same assignee as the present application and is hereby incorporated by reference), and alternatively after the amplifier.

Absolute Wavelength Calibration

Figure 8A:
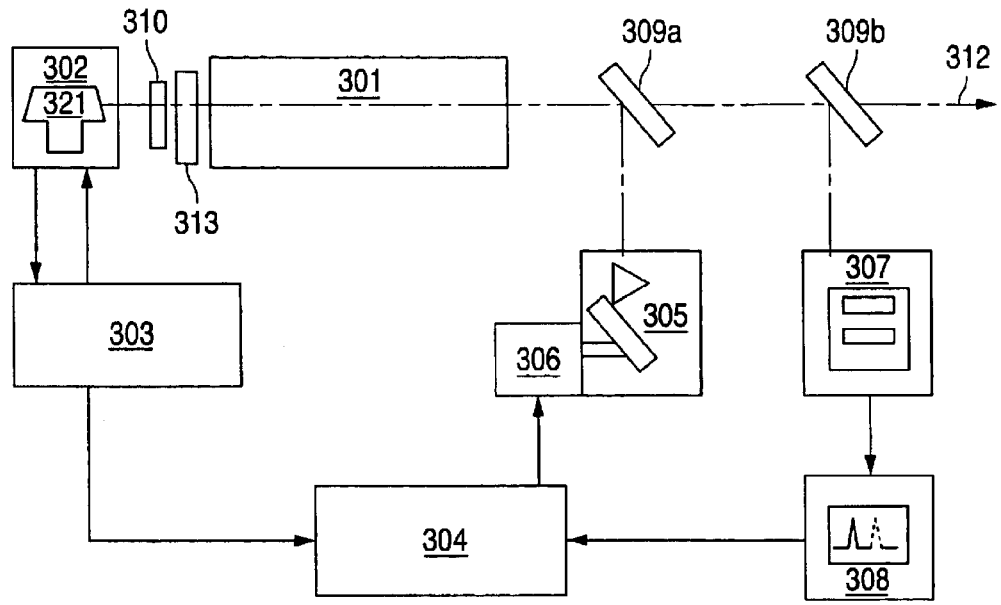
FIG. 8a schematically illustrates a first embodiment of an excimer or molecular fluorine laser system including wavelength monitoring and controlling and absolute wavelength calibration components.

A narrow band $F_2$ laser system according to a preferred embodiment is shown in FIG. 8a and described below. A $F_2$ laser chamber 301 emitting around 157 nm is surrounded by various optical and electrical components. The laser chamber 301 normally has tilted windows, e.g., at Brewster's angle. The laser system includes a resonator comprising a highly reflective mirror 310, a polarizer 313 (see also U.S. patent application Ser. Nos. 60/298,296 and 09/738,849, which are assigned to the same assignee as the present application and are hereby incorporated by reference), a beam splitter 309a and a wavelength selection and/or narrowing and tuning block 305. The system further includes a wavelength calibration system including a wavelength calibration module 302. Features of the module 302 of FIG. 8a and of the module 2 of FIG. 1 may be advantageously combined and/or interchanged.

Figure 8B:
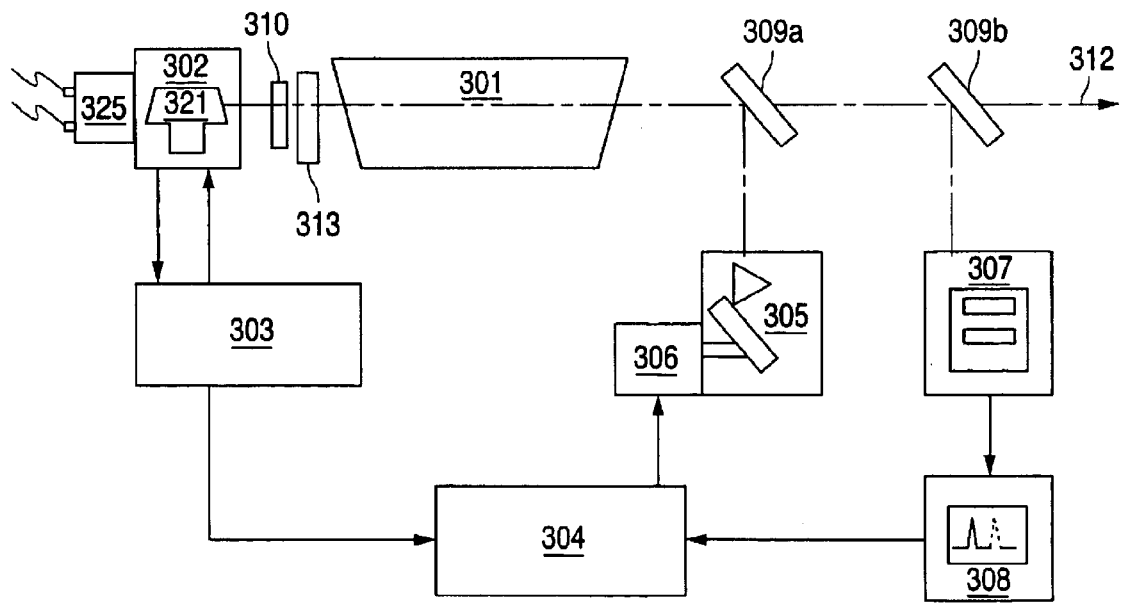
FIG. 8b schematically illustrates a second embodiment of an excimer or molecular fluorine laser system including wavelength monitoring and controlling and absolute wavelength calibration components.
Figure 9:
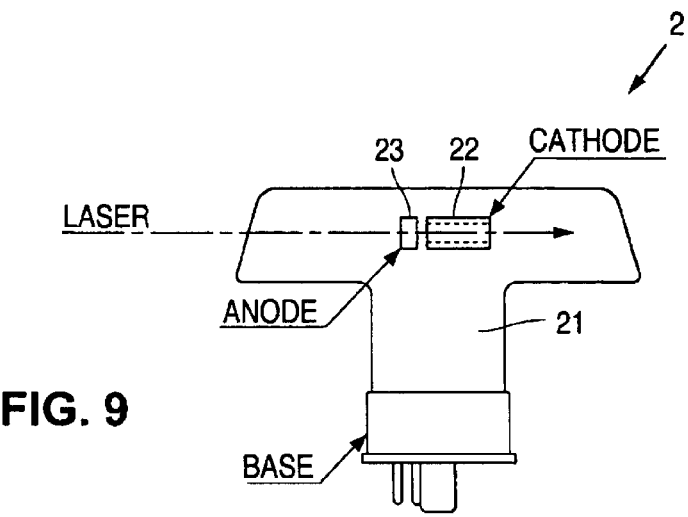
FIG. 9 schematically illustrates a wavelength calibration module of the systems of FIGS. 8a and 8b.

The discussion of the preferred embodiment with respect to the $F_2$ laser may apply with respect to some features to other laser systems such as an ArF excimer laser, and when necessary, important differences will be described. The main difference for the purposes of this discussion with reference to FIGS. 8a, 8b and 9 is that the $F_2$-laser emits around 157 nm, and the ArF emits around 193 nm. Thus, the wavelength calibration system for the $F_2$-laser will be sensitive to radiation around 157 nm, and that for the ArF-excimer laser system will be sensitive around 193 nm. It is notable, however, that platinum is an element having optical transitions around 193 nm and around 157 nm and may be advantageously used for the $F_2$ laser and for the ArF laser (see U.S. Pat. No. 6,160,832, which is hereby incorporated by reference). Also, except where discussed with respect to wavelength calibration, species such as water vapor and oxygen that strongly photoabsorb around 157 nm will be substantially removed from the optical path of any 157 nm radiation, and also preferably for 193 nm beam optical path. In addition, various species will interact differently with incident 193 nm and 157 nm radiation.

The wavelength calibration module 302 contains or comprises an element 321 which has an energy level transition line or lines around 157 nm. An energy level transition line is a detected atomic or molecular transition between atomic, electronic or molecular energy states of an element 321. An optical transition is one caused, facilitated, or stimulated by interaction of the atom or molecule with a photon of light. Examples of interactions involving optical transitions include absorption, emission, Raman scattering, and stimulated emission.

The element 321 is preferably a gaseous vapor contained within a hollow cathode lamp 302. Vaporous species that may be used as the element 321 within the module 302 have lines around 157 nm. Some of those species include bromine, selenium, silicon, and platinum. In addition, oxygen may be used as the element 321 and has several optical transition lines within the emission spectrum of the $F_2$ laser. Other species, in addition to those mentioned above, that have detectable level-transition lines within the broadband emission spectrum may be used as the element 321 contained within the wavelength calibration module 302. Quasi-transparent crystals and liquids that exhibit transition lines around 157 nm may also be used.

FIG. 9 schematically shows a galvatron which is an example of a wavelength calibration module 302. The galvatron is filled, and may be purged, with the element 321 in gaseous form. A laser beam portion may enter and/or exit the module through Brewster windows. A cathode 322 inside the galvatron may comprise the element 321 in solid form, and then release the element in gaseous form when a current is generated between the cathode 322 and its associated anode 323 inside the galvatron. Laser light from the laser chamber passes through the cathode 322 causing an inter-level resonance of the gaseous species when the wavelength of the laser light corresponds to an inter-level transition energy of the element 321. A marked voltage change is detected between the cathode 322 and the anode 323 when the laser light is tuned to these particular wavelength(s). Therefore, when the beam has a wavelength which corresponds to an energy level transition of the gaseous species 321 within the galvatron, a voltage change is detected and the absolute wavelength of the narrowed band is then determinable.

The galvatron may be used in a different way as shown in FIG. 8b. FIG. 8b includes the setup of FIG. 8a and additionally includes a photodetector arranged near the galvatron (see U.S. Pat. No. 5,450,207, which is hereby incorporated by reference). In the system of FIG. 8b, the galvatron serves as a module 302 filled with the element 321 in gaseous form, as described above. The gaseous element 321 may be caused to fill the galvatron by forming the cathode 322 of the galvatron out of the element 321 in solid form, and running a current between the anode 323 and the cathode 322 of sufficient amplitude to sublimate the element 321.

The voltage across the anode and cathode are not monitored in the system of FIG. 8b, as they are with the system of FIG. 8a (i.e., for the purpose of detecting energy level resonances according to the optogalvanic effect in species of the element 821 induced by the presence of the incident light). Instead, the intensity of the light as it passes through the galvatron is detected. By so doing, absorption lines of the element 321 are detected when the detected intensity is reduced below that which is expected at the wavelengths corresponding to the absorption lines. Since the absolute wavelengths of photoabsorption are known for the element 321, the absolute wavelength of the laser light is determinable and equipment may be calibrated.

The wavelength of the laser light is determined from a knowledge of the energy band levels and transition probabilities of species of the gaseous element 321. That is, when the wavelength of the laser beam is tuned, the absolute wavelength of the beam is precisely determined each time it corresponds to an inter-level transition energy of the gaseous species 321 having a finite transition probability density. The absolute wavelengths of the transition level resonance modes are precisely and reliably known since they are determined by relative positions of adjacent or removed quantized energy states of the photo-absorbing element, and applicable transition-selection rules.

A $F_2$ laser system including a wavelength calibration module 302 as in FIGS. 8a and 8b may include the following electrical and optical components. A main control unit 304 communicates electronically with a motor drive 306 for a line-narrowing and tuning block 305, as well as with a display 308. The main control unit 304 is either a standard PC or an especially designed microprocessor unit for controlling the laser system.

The system further includes a signal processing and driving source 303 for the wavelength calibration module 302. The signal processing and driving source 303 provides an electrical supply for the wavelength calibration module 302. The signal processing and driving source further detects changes in current through the galvatron when irradiated with narrow bandwidth radiation matching a transition line of the gaseous element 321. These current changes can be quite small, and thus, precision circuitry is often used.

The display 308 receives its signal information from a wavelength monitoring component 307. The wavelength monitoring component 307 preferably includes a wavelength dispersion element and a photodetector. A typical layout includes a monitor etalon, some lenses and a photo diode array, wherein the etalon fringe pattern is imaged onto the diode array. When the wavelength of the laser is tuned by the motor drive 306, then the fringe pattern moves on the diode array and the wavelength shift can be measured.

On one end of the laser chamber 301, a light beam from the chamber 301 impinges a first beam splitter 309a which separates the beam into a component directed toward the line narrowing and tuning block 305, and a component which is unreflected. The line selection and/or narrowing and tuning block is the line selection part of the resonator. The beam splitter 309a may be a polarizing beam splitter. The line narrowing and tuning block 305 can comprise one or more prisms and a high reflectivity mirror. The line narrowing and tuning block 305 can comprise one or more prisms and a grating when line narrowing to less than 1 pm is desired. For further line narrowing, the line narrowing and tuning block can comprise one or more etalons. Line-narrowing may also preferably be achieved by reducing the pressure of the gas mixture. Thus, a single line such as the 157.63 nm line may be selected among the multiple emission lines of the $F_2$ laser, and then the width of the selected line may be adjusted by adjusting the pressure of the gas mixture by adjusting the buffer gas pressure.

The beam splitter 309a reflects some of the beam and most of the rest of the beam continues unreflected along the optical path. The unreflected portion impinges a second beam splitter 309b which separates the unreflected beam into a component directed toward the wavelength monitoring component 307, and a component which serves as the narrow band output beam 312.

At the other end of the chamber 301, a beam emerges from the chamber 301 and impinges a polarizer 313 and later impinges a resonator mirror 310. The preferred resonator of FIG. 8a is thus a polarization coupled resonator design. The polarizer 313 adjusts the polarization state of the laser radiation, which is particularly significant upon being directed onto the beam splitter 309a. The chamber 301 may also have one or more windows tilted at Brewster's angle with respect to the resonating beam. Alternatively, but not preferred, an output coupler may be used and, if used, would be inserted between the beam splitters 309a and 309b.

In the preferred arrangement, the resonator mirror 310 reflects most of the beam, but allows a small portion to continue unreflected, either by transmittance through the mirror 310 or by simply not impinging the mirror 310. Typically in the transmission case, the mirror 310 has a transmittance in the range from 0.1 to 1%. Specifically, the transmittance is preferably around 0.5%. The unreflected portion continues until it impinges the wavelength calibration tool 302.

Using this preferred arrangement, very precise absolute wavelength calibration can be performed. The calibration can be performed during operation of the system in its usual capacity, or during a short interim period between scheduled or unscheduled run times, without additional optical alignment, and may be performed at the factory.

Referring specifically to the system of FIG. 8a, an exemplary calibration procedure using the system of FIG. 8a is as follows. First, a coarse tuning of a narrow band emission of the $F_2$-laser by the main control unit 304 is done via the spectral narrowing module 305, and the motor drive 306. Alternatively, the gas mixture composition and/or total pressure may be adjusted. The spectral narrowing module 305 may include a grating, prism(s), interferometric device(s), etc., and is used for coarse tuning of the wavelength of the system. The wavelength position is observed by a relative wavelength monitoring module 307 preferably including an etalon which is calibrated to the absolute standard using the module 302. The fringe pattern is displayed on the display 308. Simultaneously, a signal of the potential difference between the cathode 322 and the anode 323 of the module 302 is monitored by the signal processing unit 303. The main processing and data recording element 304 communicates with the signal processing and driving source 303. When a coincidence of the wavelength of the narrowed spectral beam with one of the optical transition lines of the element 321 occurs, as discovered by a marked voltage increase, a fine tuning across the known waveform of the line proceeds for determining more precisely the absolute position of the narrowed band. The position of the transition line corresponding to the spectral arrangement of the system, is recorded by the main control unit 304 for future reference. The wavelength may be moved away from the absorption line to a desired wavelength near the absorption line using the wavelength monitoring module 307 including the monitor etalon, and the information about the position of the absorption line relative to the fringe pattern produced by the etalon.

A modification in the design of the galvatron 302 can be performed which serves to enhance the wavelength of the transition line(s) around 157 nm. The signal to noise ratio for the system may thus be enhanced by using special mixtures of buffer gases, and preferably including Ne, and evaporized elements and/or special cathode materials. An enhancement of usual absorption signals of the galvatron and/or a rise of weaker lines situated nearer the middle of the tuning range could be expected. Alternatively, the arrangement of FIG. 8a may be modified to include a photodetector 325 near the galvatron and located such that the portion of laser light traversing the element 321, later impinges the photodetector 325. The preferred method is then modified using the embodiment of FIG. 8b, such that the voltage between the cathode 322 and the anode 323 is not monitored. A current is only generated between the cathode 322 and anode 323, if at all, to cause gaseous release of the solid element 321 comprising the cathode 322. The photodetector 325 monitors the intensity of the light emitted from the $F_2$-laser chamber after it has traversed the gaseous galvatron medium. At absorption lines of the gaseous species 321, the absolute wavelength of the light is determinable. Further to this alternative method, a hollow lamp may be filled with the gaseous element 321 in another way than release from a cathode 322, thus obviating the need for the cathode 322 and anode 323. The galvatron of the embodiment of FIG. 8a is then modified to be a chamber filled with the gaseous element 321 and arranged along the excimer-laser beam path between the discharge chamber 301 and the photodetector 325.

Buffer Gas Pressure Adjustments

Figure 10:
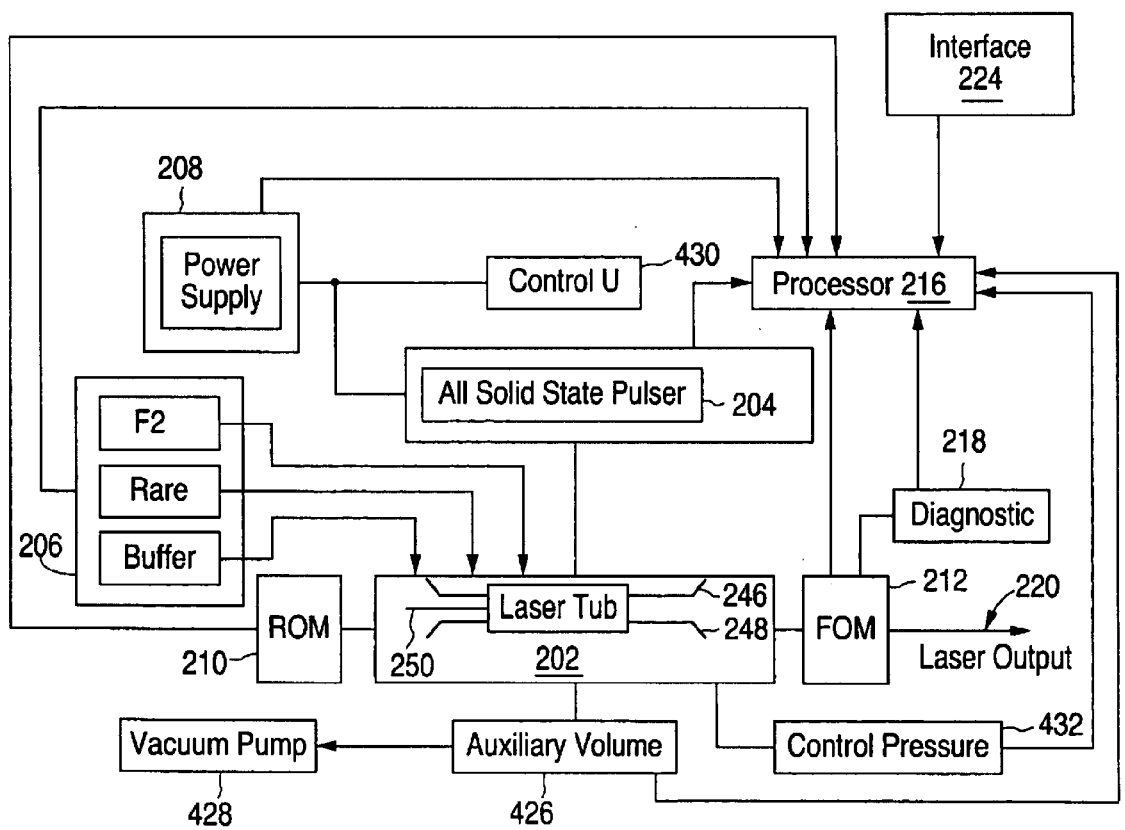
FIG. 10 schematically illustrates a molecular fluorine laser system including an auxiliary volume for adjusting the total gas mixture pressure and/or relative partial pressures of two or more buffer gases.

As shown in FIG. 10, the processor 216 preferably communicates with the solid-state or thyratron pulser module 204 and HV power supply 208, separately or in combination, the gas handling module 206, the optics modules 210 and/or 212, the diagnostic module 218, and an interface 224. These laser system components are also shown and described above with reference to FIG. 7. A specific energy control component 430 is also shown in FIG. 10 for controlling the energy supplied to the electrodes 246,248,250 by the pulser 204 and power supply 208. The processor 216 may also control an auxiliary volume 426 (see also U.S. patent application Ser. No. 09/780,120, which is assigned to the same assignee as the present application and is hereby incorporated by reference) which may be connected to a vacuum pump 428 for releasing gases from the laser tube 202 for reducing a total pressure in the tube 202 according to preferred embodiments. The total pressure may be initially at the lower pressure desired for producing a bandwidth of 5 pm or below, as is preferred, and no auxiliary volume 426 may be used. The use of the auxiliary volume 426 however permits a wide range of pressures to be controlled as the pressure in the laser tube 202, and rapid adjustments of the total pressure may be thereby made.

Total pressure adjustments in the form of releases of gases or reduction of the total pressure within the laser tube 202 are preferably facilitated by using the auxiliary volume 426. A valve is opened between the auxiliary volume 426 and the gas mixture in the laser tube 202 when the auxiliary volume 426 is at lower pressure than the laser tube 202, preferably due to the vacuum pump 428 being connected to the auxiliary volume 426 before or during the pressure release. Total pressure adjustments in the form of increases in the total pressure may be performed using the valves of the gas handling unit 206 and injecting combinations of gases or only a single gas such as the buffer gas of helium, neon or a combination thereof. Total pressure adjustments may be followed by gas composition adjustments if it is determined that, e.g., other than the desired partial pressure of halogen gas is within the laser tube 202 after the total pressure adjustment. Total pressure adjustments may also be performed after gas replenishment actions, and may be performed in combination with smaller adjustments of the driving voltage to the discharge than would be made if no pressure adjustments were performed in combination.

The auxiliary volume 426 is connected to the laser tube 202 for releasing gas from the laser tube 202 into the volume 426 based on control signals received from the processor 216. The processor 216 regulates the release of gases via a valve assembly to the auxiliary volume 426, and also regulates the delivery of gases or mixtures of gases to the laser tube 202 via a valve assembly or system of valves associated with the gas handling unit 206.

The auxiliary volume 426 preferably includes a reservoir or compartment having a known volume and preferably having a pressure gauge attached for measuring the pressure in the auxiliary volume. Alternatively or in combination with the pressure gauge, a flow rate controller 432 allows the processor to control the flow rate of gases from the tube 202 to the auxiliary volume 426, so that the processor may control and/or determine precisely how much gas is being released or has been released. The auxiliary volume 426 as well as the laser tube may also each have means, such as a thermocouple arrangement, for measuring the temperature of the gases within the volume 426 and tube 202. The compartment may be a few to thousands of cm3 or so in volumetric size (the laser tube 202 may be around 30,000 to 50,000 cm3 volumetrically).

At least one valve is included for controlling the flow of gases between the laser tube 202 and the auxiliary volume 426. Additional valves may be included therebetween. Another valve is also included between the vacuum pump 428 and the auxiliary volume 426 for controlling access between the vacuum pump 428 and the auxiliary volume 426. A further valve or valves may be provided between either or both of the vacuum pump 428 and auxiliary volume 426 and the laser tube 202 and the auxiliary volume 426 for controlling the atmosphere in the line therebetween, and an additional pump or the same vacuum pump 428 may be used to evacuate the line between the laser tube 202 and auxiliary volume 426 either directly or through the auxiliary volume 426.

Predetermined amounts of the gas mixture in the tube 202 are preferably released into the auxiliary volume 426 from the laser tube 202 for total pressure releases according to algorithms which provide instructions to the processor 216 (see the Ser. No. 09/780,120 application). This same auxiliary volume 426 may be used in partial, mini- or macro-gas replacement operations such as are set forth in the U.S. Pat. No. 6,389,052, incorporated by reference above. As an example, the gas handling unit 206 connected to the laser tube 202 either directly or through an additional valve assembly, such as may include a small compartment for regulating the amount of gas injected (see the '052 patent), may include a gas line for injecting a premix A including 1% $F_2$:99% Ne (or 5% $F_2$:95% Ne, or another mixture), and another gas line for injecting a buffer gas of helium and/or neon for a $F_2$ laser. Thus, by injecting premix A into the tube 202 via the valve assembly, the fluorine concentration (for the $F_2$ laser, e.g.) in the laser tube 202 may be replenished. Then, a certain amount of gas is released corresponding to the amount that was injected. Additional gas lines and/or valves may be used for injecting additional gas mixtures. New fills, partial and mini gas replacements and gas injection procedures, e.g., enhanced and ordinary micro-halogen injections, and any and all other gas replenishment actions are initiated and controlled by the processor 216 which controls valve assemblies of the gas handling unit 206, laser tube 202, auxiliary volume 426 and vacuum pump 428 based on various input information in a feedback loop.

Figure 11:
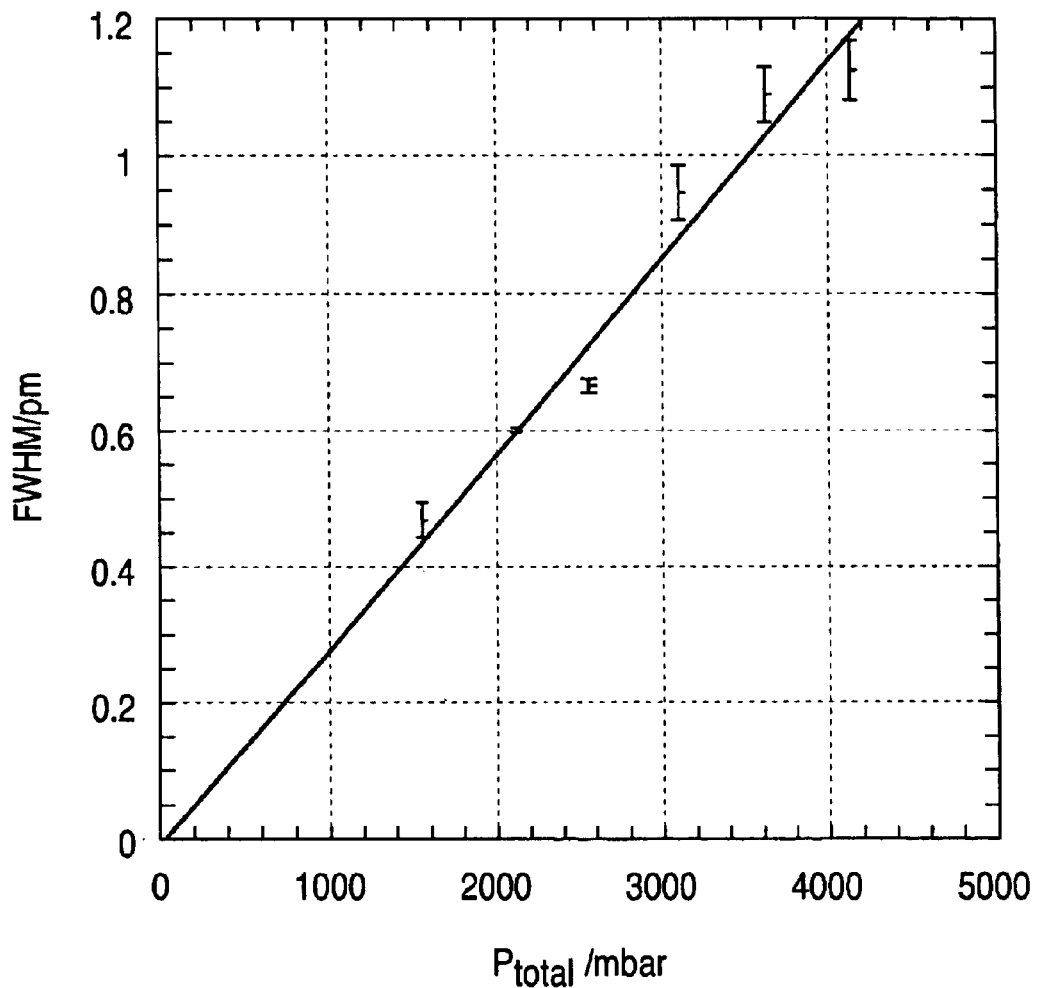
FIG. 11 is a graph which shows a pressure dependence of the bandwidth in a pressure range from 0 mbar to 5000 mbar indicating a linear dependence of the bandwidth on the total gas pressure in the $F_2$ laser tube.

FIG. 11 shows a pressure dependence of the bandwidth in a pressure range from 0 mbar to 5000 mbar indicating a linear dependence of the bandwidth on the total gas pressure in the $F_2$ laser tube. FIG. 11 shows that at a total pressure of 0 mbar, the bandwidth is 0 mbar, and at a total pressure of less than 2500 mbar, the bandwidth is less than around 0.7 pm, and at a total pressure of less than 2000 mbar, the bandwidth is less than around 0.6 pm, and at a total pressure of less than 1500 mbar, the bandwidth is less than around 0.4 pm, and at a total pressure of less than 1000 mbar, the bandwidth is less than around 0.3 pm, and at a total pressure of less than 500 mbar, the bandwidth is less than around 0.15 pm. As mentioned above, the trade-off for reducing the total pressure and achieving an advantageously smaller bandwidth is loss of energy that may be compensated using an amplifier or increasing the driving voltage, varying the amount of fluorine in the laser tube, varying the reflectivity of the outcoupler, perhaps increasing the repetition rate (to increase the energy dose per time), lengthening the electrodes, etc. Also, the bandwidth may be maintained just at a specified bandwidth, and not below even though the pressure could be reduced to achieve a lower bandwidth than is specified, in order to maintain the energy at a specified level. A balancing analysis is performed, and the flexibility of being able to select a bandwidth and then adjust the system to maintain the specified energy is highly advantageous.

As illustrated at FIG. 11, a bandwidth around 0.6 pm is achieved with a gas pressure of 3 bar. FIG. 11 shows a bandwidth dependence on the total pressure of around 0.3 pm/bar, illustrating that the pressure dependence may vary with other laser conditions and/or parameters.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. A molecular fluorine laser system, comprising:

a discharge tube filled with a gas mixture including molecular fluorine and at least two buffer gases including a first buffer gas and a second buffer gas;

a plurality of electrodes within the discharge tube;

a pulsed discharge circuit connected to the electrodes for energizing the gas mixture;

a line-selection optic for selecting one of multiple closely-spaced lines around 157 nm emitted from the discharge tube;

a laser resonator including the line-selection optic and the discharge tube for generating a beam of laser pulses having a wavelength around 157 nm at a bandwidth of less than 1 pm;

a diagnostic module for monitoring one or more spectral parameters of the laser pulses;

a processor for receiving diagnostic signals containing spectral information from the diagnostic module; and a gas handling unit for receiving instruction signals from the processor and for adjusting the amount of at least one of the first and second buffer gases based on information contained in said instruction signals to control at least one of the one or more spectral parameters of the laser pulses;

wherein the at least one of the one or more spectral parameters includes wavelength;

wherein the first and second buffer gases are correspondingly adjusted so that the wavelength is adjusted to a desired value by adjusting the relative concentrations of the first and second buffer gases; and wherein the total pressure of the gas mixture is maintained substantially constant when the relative concentrations of the first and second buffer gases is adjusted.

* * * * *